US 12,501,909 B2

(12) United States Patent
Müller et al.

(10) Patent No.: US 12,501,909 B2
(45) Date of Patent: Dec. 23, 2025

(54) PRESSING DEVICE

(71) Applicant: Textor Maschinenbau GmbH, Wolfertschwenden (DE)

(72) Inventors: Fabian Müller, Betzigau (DE); Josef Mayer, Memmingerberg (DE); Matthias Hehle, Waltenhofen (DE); Markus Seidel, Egg an der Günz (DE); Theodor Horst, Amöneburg-Rossdorf (DE)

(73) Assignee: Textor Maschinenbau GmbH, Wolfertschwenden (DE)

( * ) Notice: Subject to any disclaimer, the term of this patent is extended or adjusted under 35 U.S.C. 154(b) by 488 days.

(21) Appl. No.: 17/962,015

(22) Filed: Oct. 7, 2022

(65) Prior Publication Data

US 2023/0112344 A1 Apr. 13, 2023

(30) Foreign Application Priority Data

Oct. 12, 2021 (DE) .......................... 102021126436.7
Oct. 12, 2021 (DE) .......................... 102021126437.5
Feb. 4, 2022 (DE) .......................... 102022102667.1

(51) Int. Cl.
*A22C 7/00* (2006.01)
*B30B 1/26* (2006.01)

(52) U.S. Cl.
CPC .............. *A22C 7/003* (2013.01); *B30B 1/261* (2013.01); *B30B 1/266* (2013.01)

(58) Field of Classification Search
CPC .... B30B 1/06; B30B 1/14; B30B 1/28; B30B 1/261; B30B 1/266; B30B 1/26; A22C 7/0023–0084
See application file for complete search history.

(56) References Cited

U.S. PATENT DOCUMENTS 3,576,162 A * 4/1971 McBrady ............. A22C 7/0023
53/529
3,842,260 A * 10/1974 Christensen ......... A22C 7/0061
250/221

FOREIGN PATENT DOCUMENTS

| CN | 112006074 A | 12/2020 |
| CN | 113349237 A | 9/2021 |
| DE | 602005003037 T2 | 8/2008 |

(Continued)

OTHER PUBLICATIONS

Translation of KR-20170021131.*

(Continued)

*Primary Examiner* — Bobby Yeonjin Kim
(74) *Attorney, Agent, or Firm* — Erise IP, P.A.

(57) ABSTRACT

A pressing device for pressing meat products, in particular frozen and/or partly frozen meat products, preferably fresh meat products and/or bacon, comprises a pressing chamber. The pressing chamber comprises a counter-element and a pressing member that is movable by a drive, wherein the pressing member can be moved from a starting position towards the counter-element into an end position in order to compress the product, and wherein the drive is configured to drive at least one eccentric cam, which is rotatable about an axis of rotation, in order to move the pressing member from the starting position into the end position, wherein the pressing member can be moved from the starting position into the end position by a rotation of the eccentric cam of more than 90 degrees.

23 Claims, 20 Drawing Sheets

(56) References Cited

FOREIGN PATENT DOCUMENTS

Figure 1D:
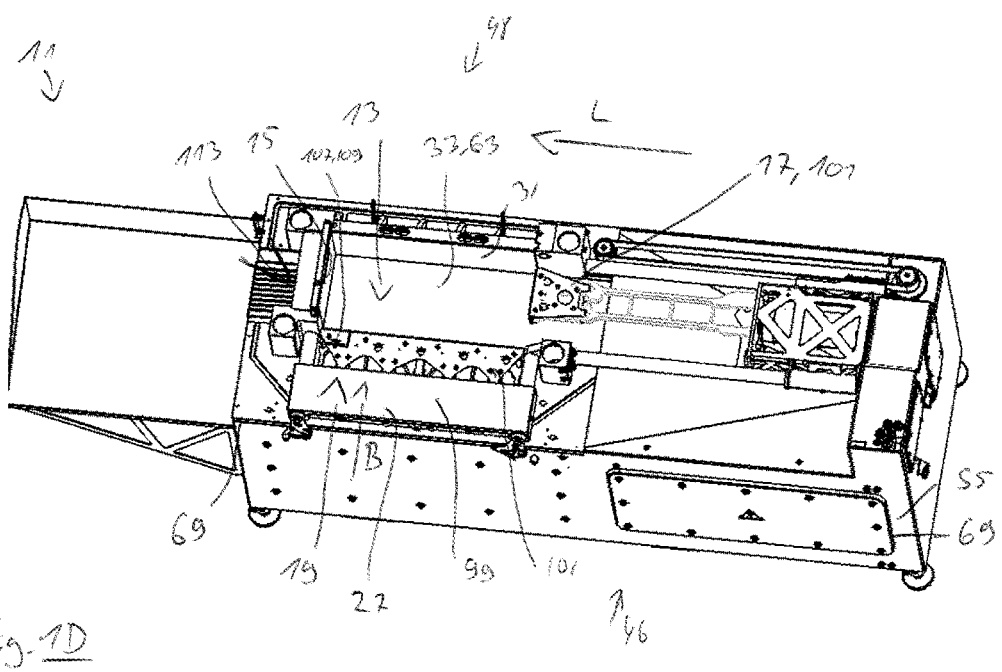

| DE | 102016122126 A1   | 11/2017 | |
|----|-------------------|---------|---|
| DE | 112018001445 T5   | 12/2019 | |
| DE | 102020115748 A1   | 1/2021  | |
| DE | 102020103312 A1   | 8/2021  | |
| ES |     2228358 T3 *  | 4/2005  | ............... B21D 3/10 |
| FR |     2548089 A3 *  | 1/1985  | ............... B30B 9/28 |
| KR |   20170021131 A * | 2/2017  | ........... A22C 7/0023 |
| WO |     1990003736 A1 | 4/1990  | |
| WO |   WO-9003736 A1 * | 4/1990  | ............... B30B 1/32 |

OTHER PUBLICATIONS

Translation of ES-2228358.*
Translation of FR-2548089.*
German Search Report mailed Feb. 15, 2022 for German Application No. 10 2021 126 436.7, 6 pages.
German Search Report mailed Feb. 15, 2022 for German Application No. 10 2021 126 437.5, 7 pages.
German Search Report mailed Nov. 24, 2022 for German Application No. 10 2021 006 622.7, 5 pages.
Machine Translation of European Search Report mailed Feb. 23, 2023 corresponding to European Patent Application 22198176.4, 16 pages.
Machine Translation of Extended European Search Report mailed Mar. 14, 2023 corresponding to European Patent Application 22198200.2, 18 pages.

* cited by examiner

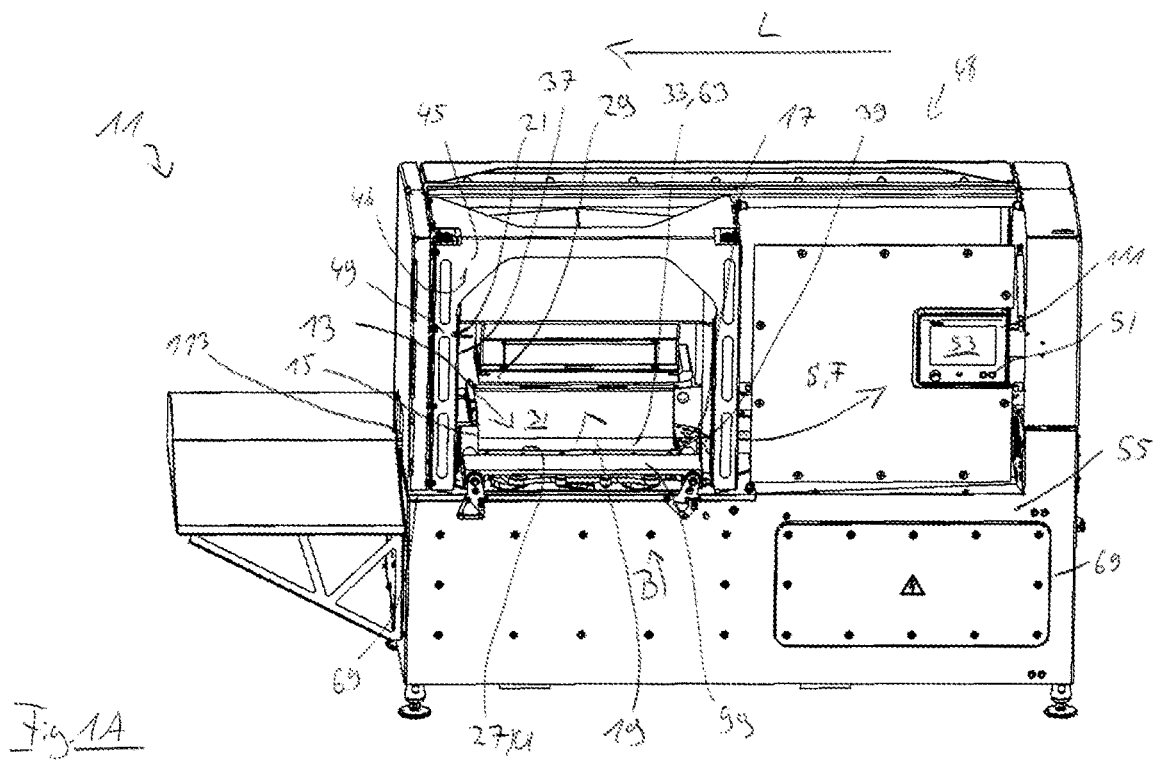

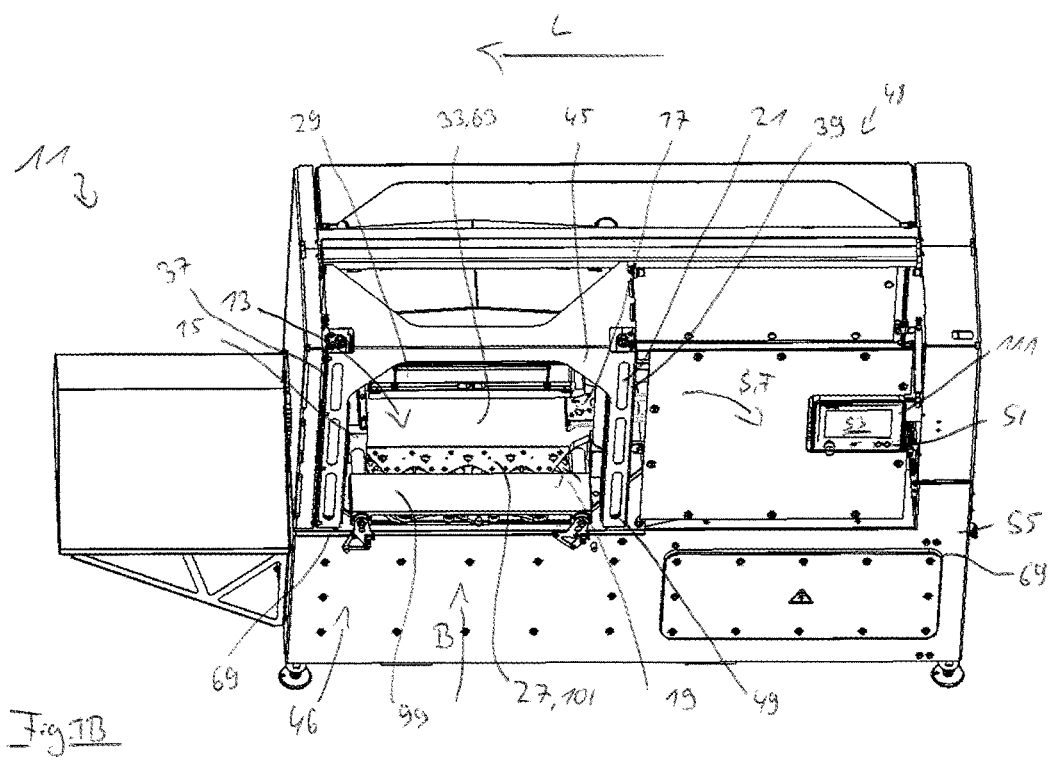

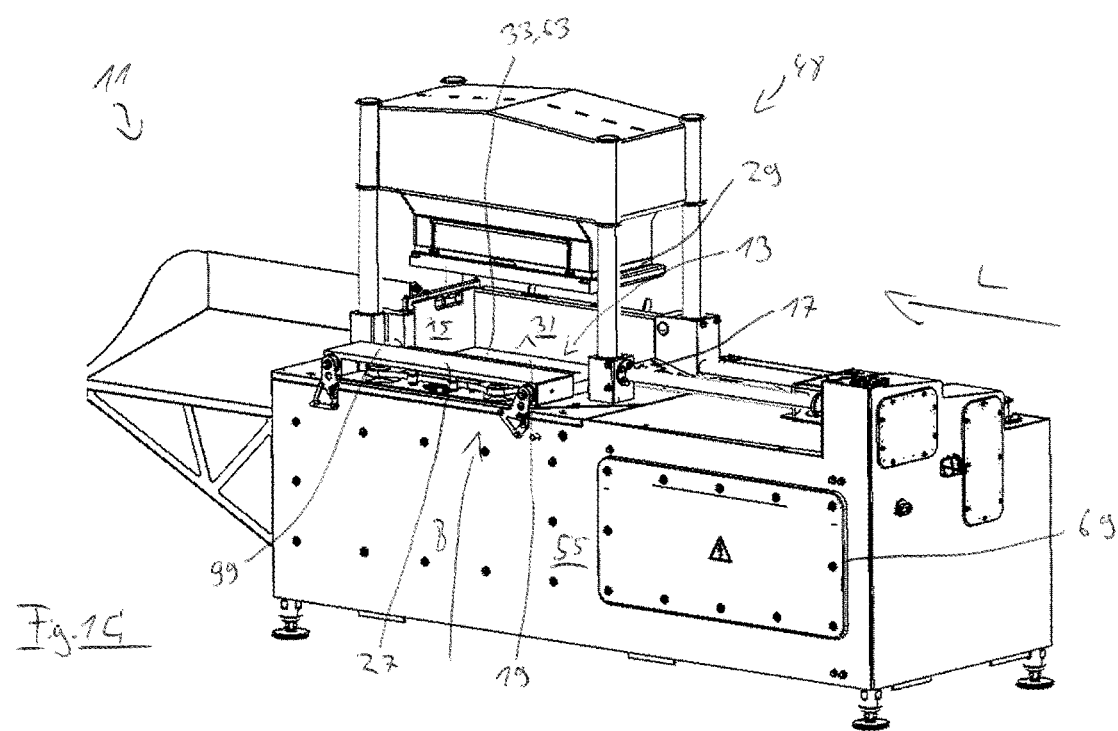

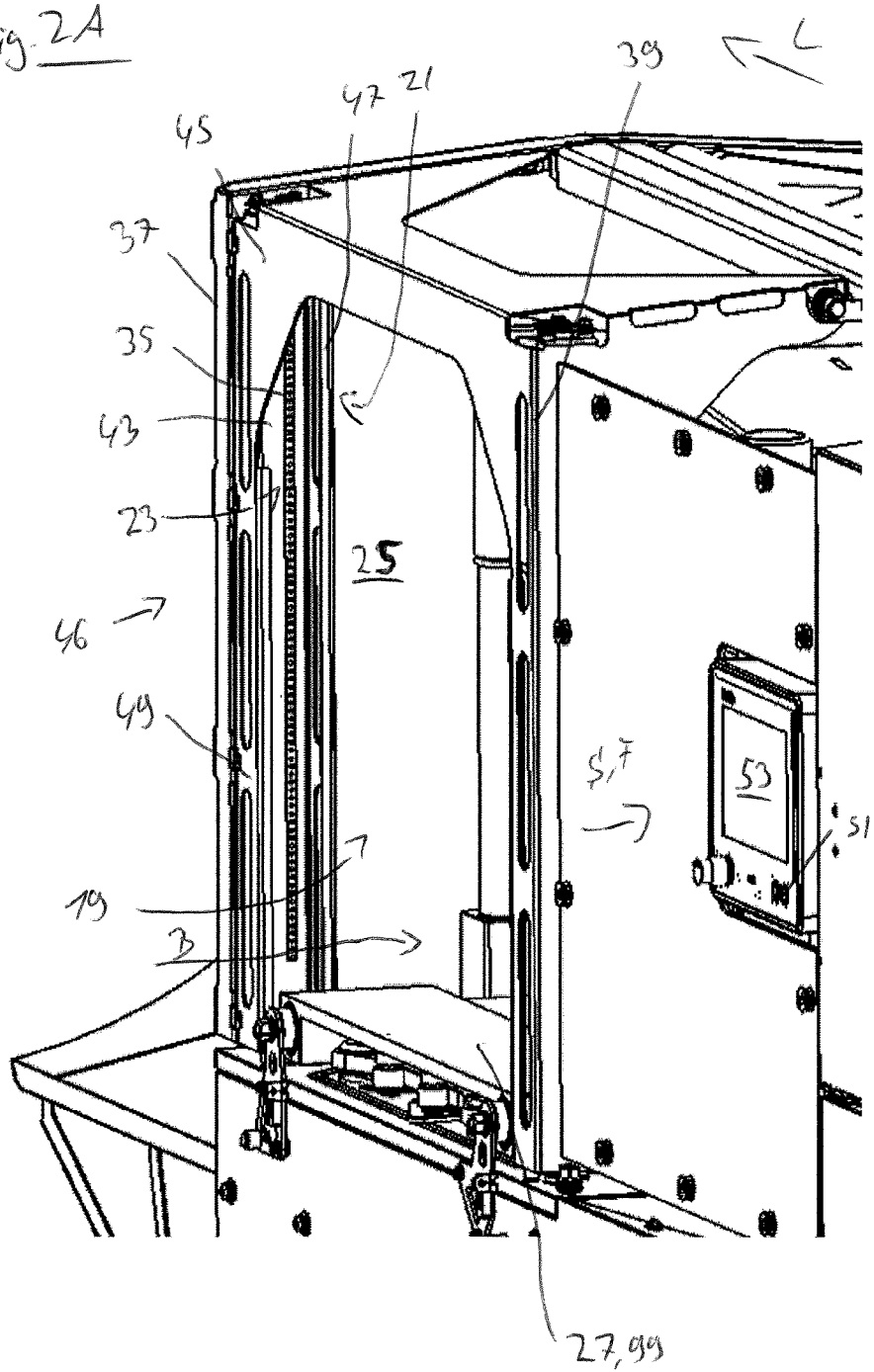

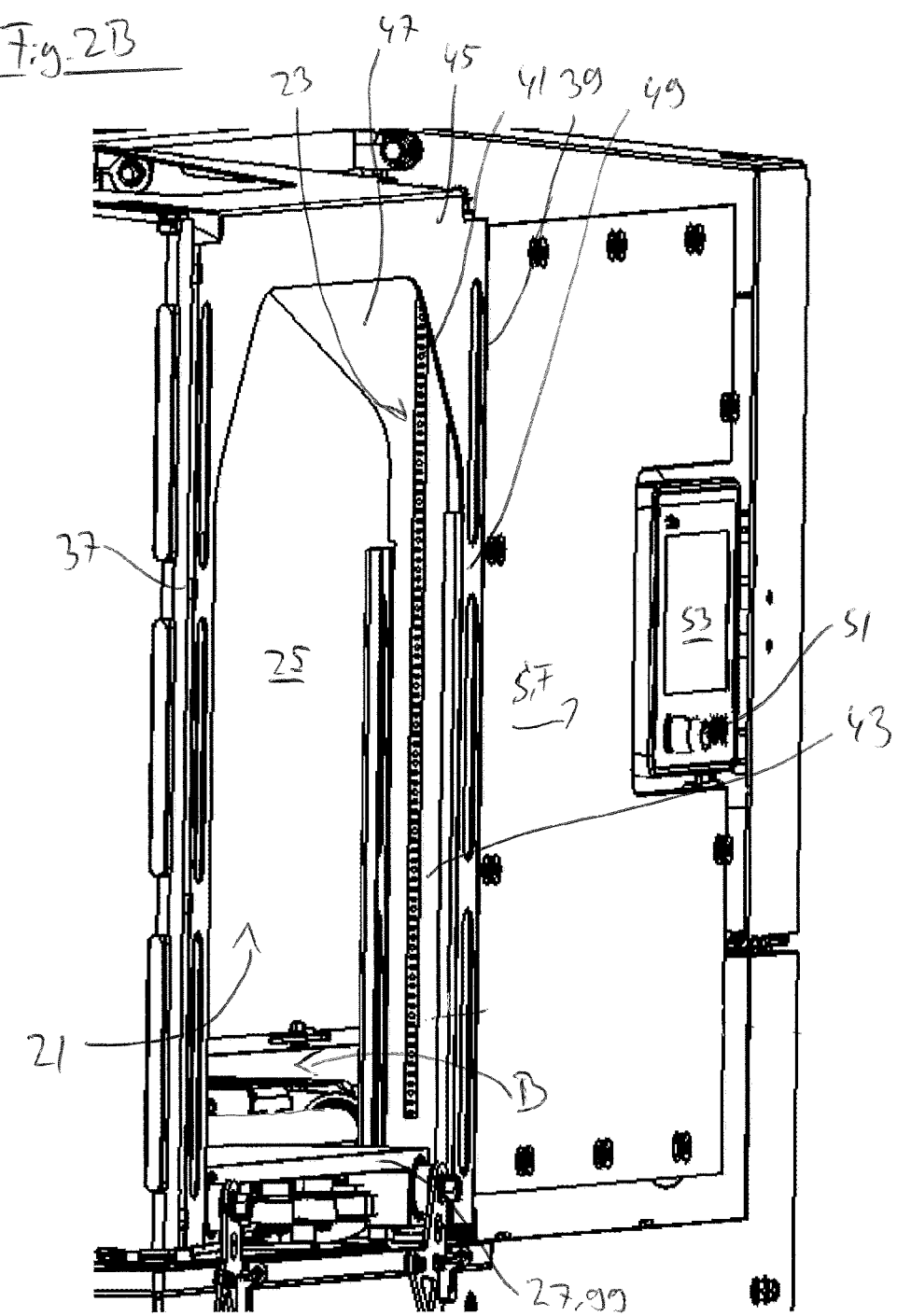

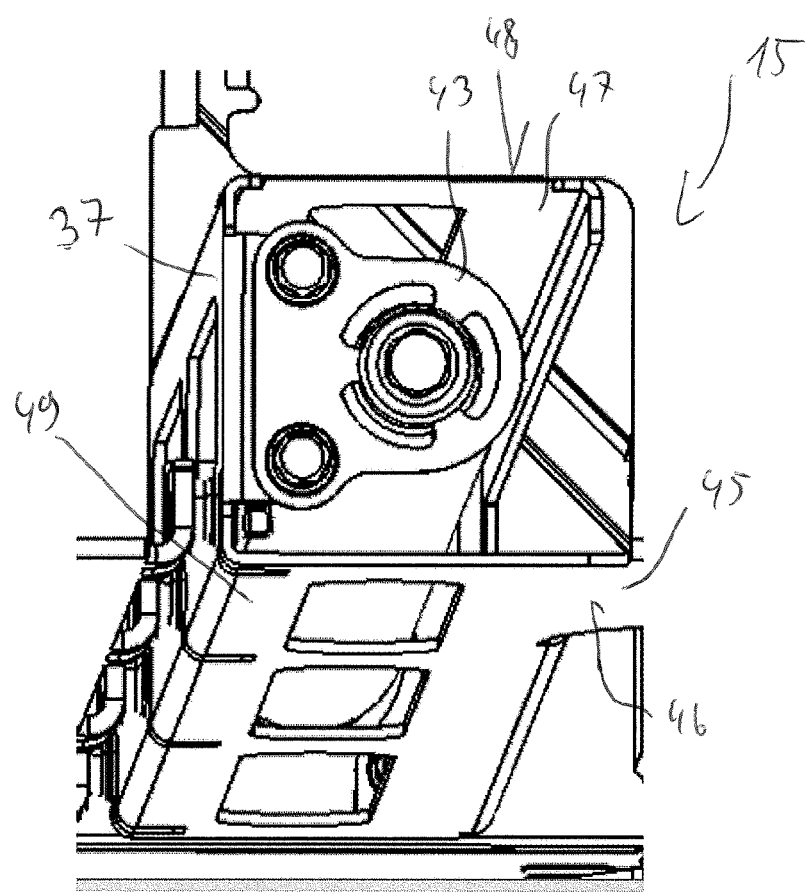

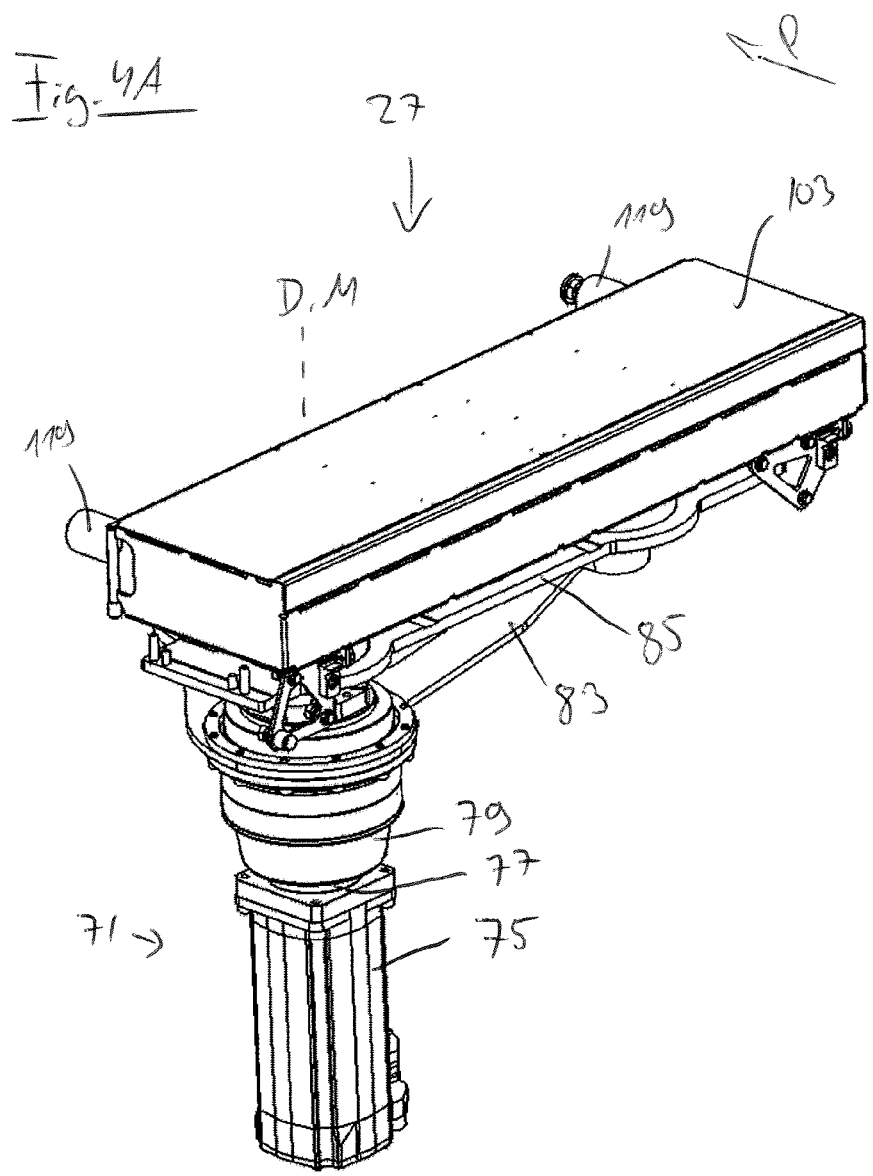

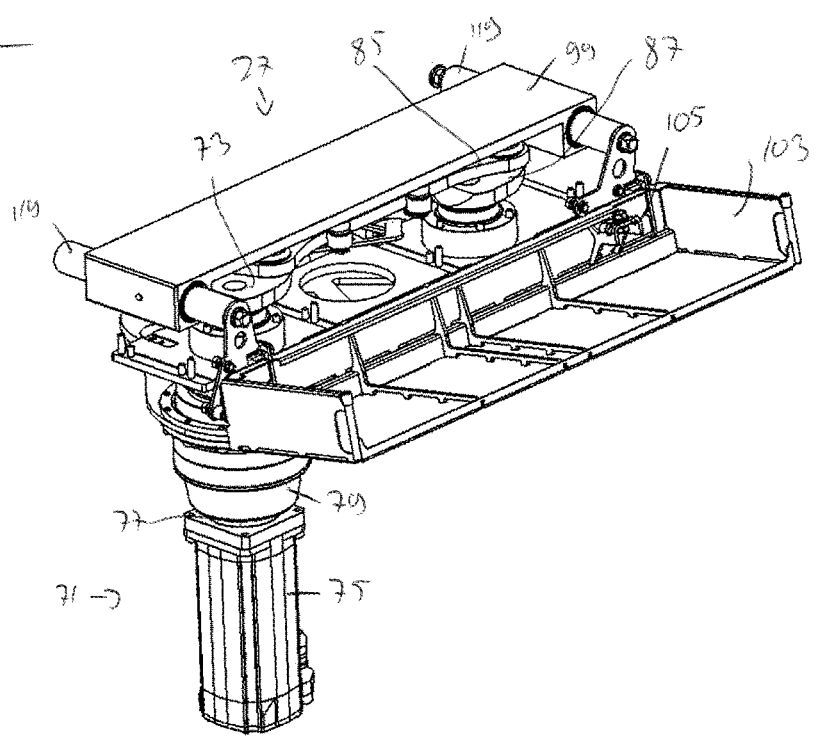

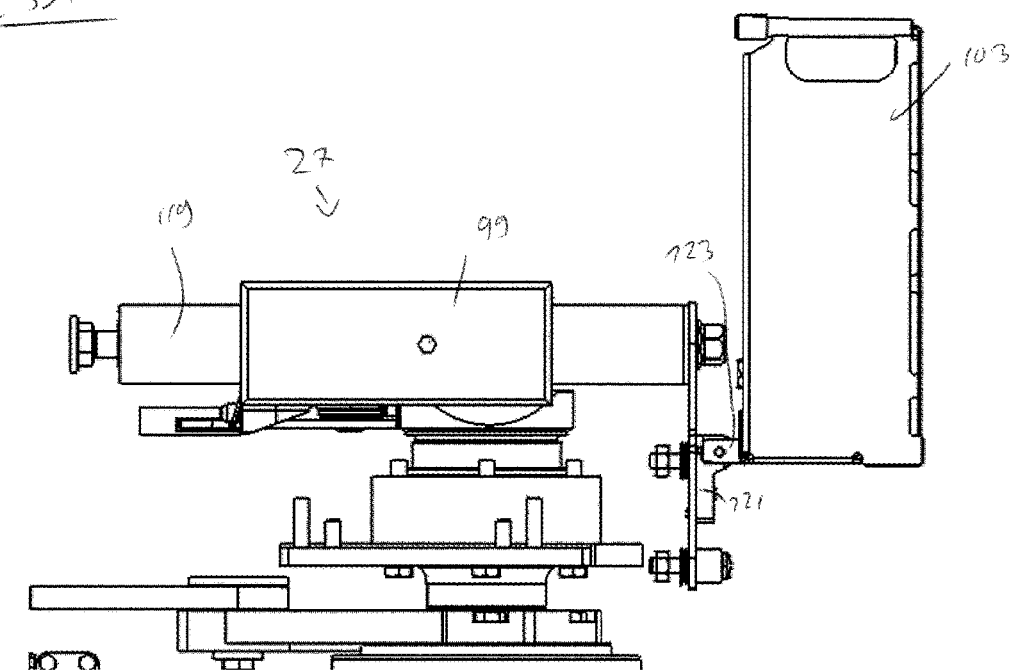

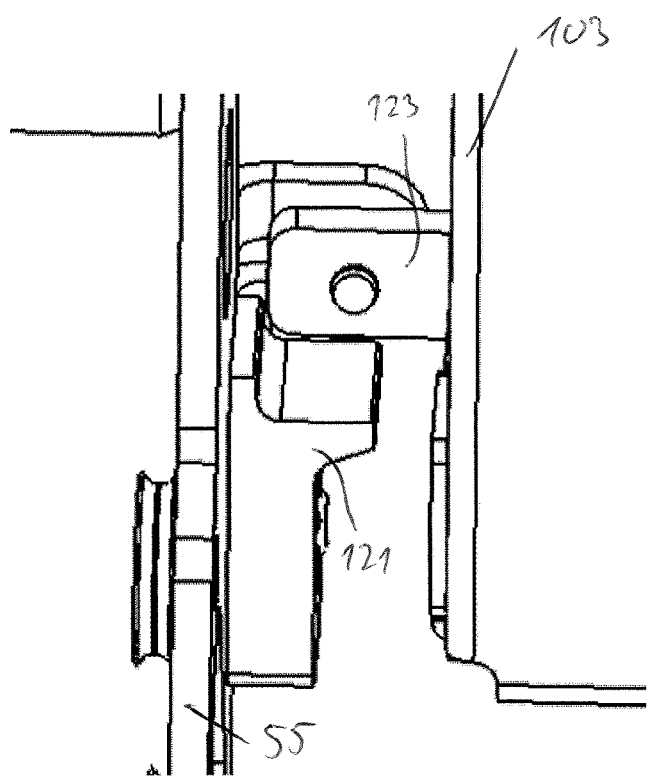

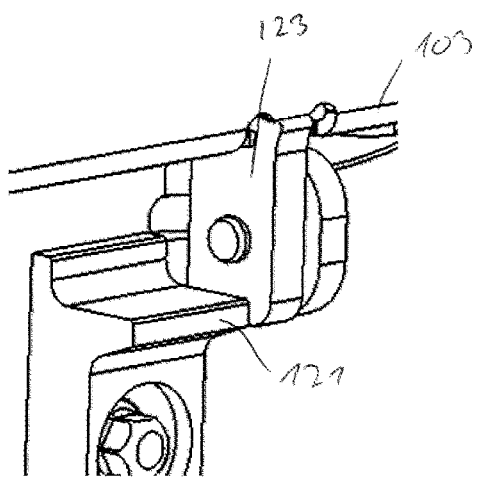

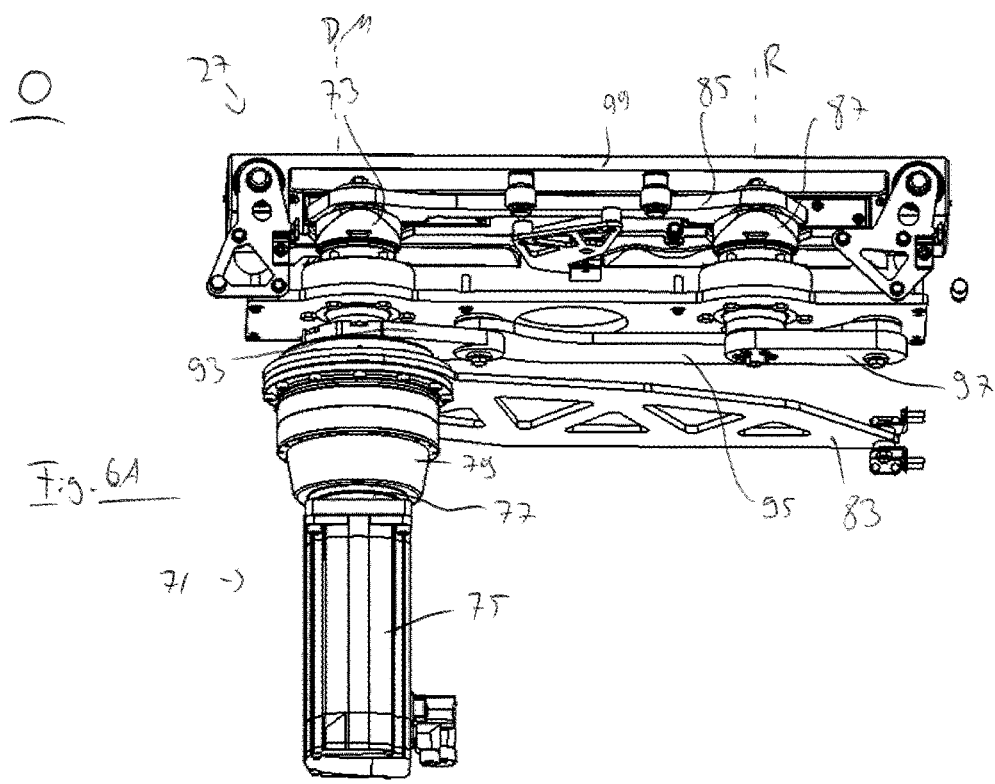

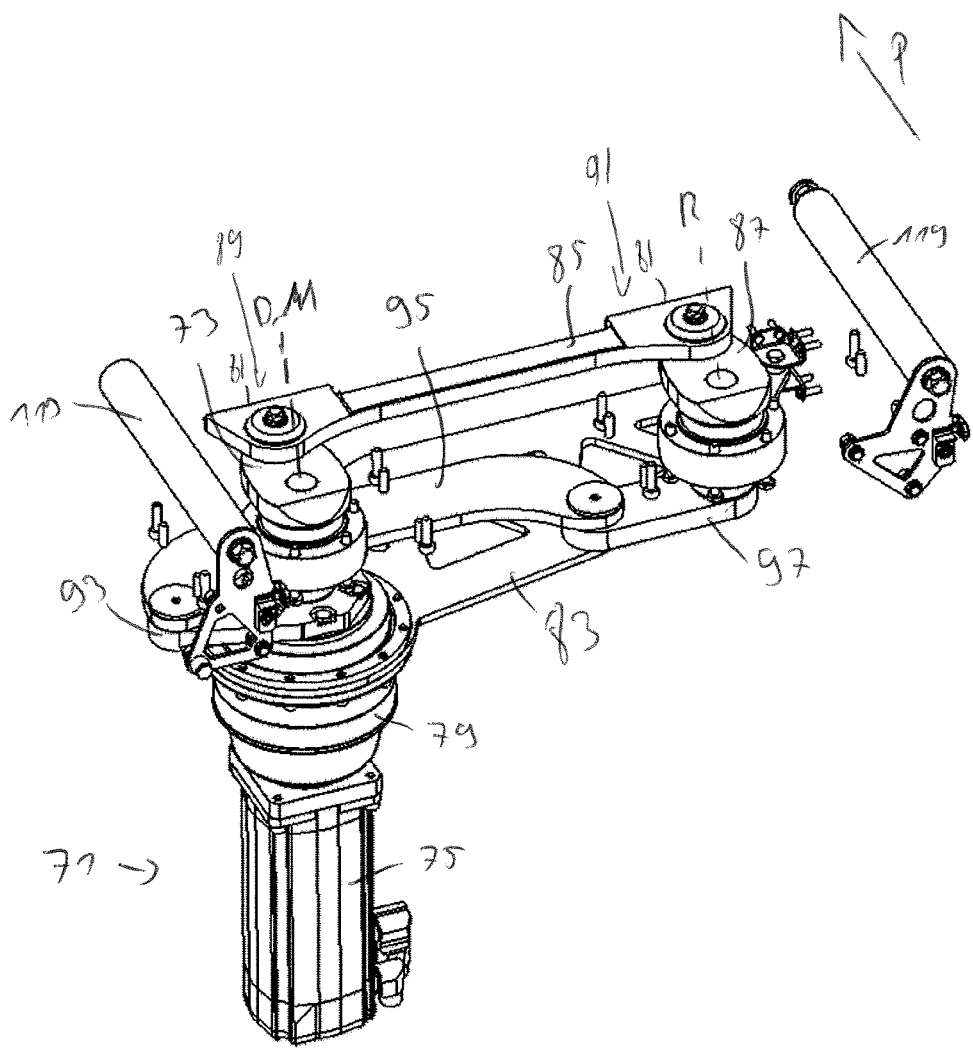

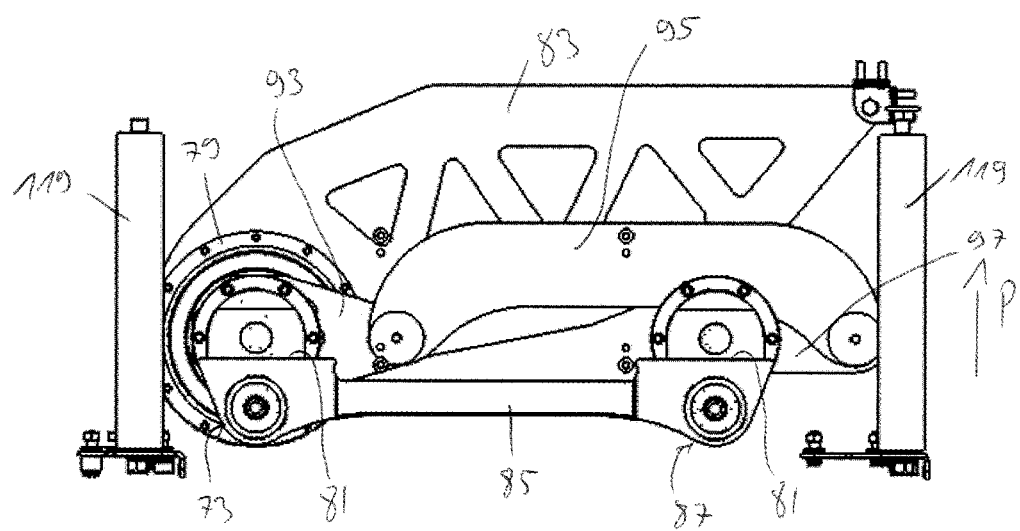

PRESSING DEVICE

CROSS-REFERENCES TO RELATED APPLICATIONS

This patent application claims the priority of German Application No. 10 2021 126 436.7, filed Oct. 12, 2021; German Application No. 10 2021 126 437.5, filed Oct. 12, 2021; and German Application No. 10 2022 102 667.1, filed Feb. 4, 2022, which are incorporated herein by reference in their entirety.

The invention relates to a pressing device for pressing meat products, in particular frozen and/or partly frozen meat products, preferably fresh meat products and/or bacon, comprising a pressing chamber which extends along a longitudinal direction and into which a product to be pressed may be inserted. The pressing chamber comprises at least one counter-element and a pressing member that is movable by a drive, wherein the pressing member may be moved from a starting position along a pressing direction towards the counter-element into an end position in order to compress the product.

Such pressing devices may in particular be provided to compress food products into a predetermined shape to be able to feed the compressed food products to further processing steps. Natural products may in particular have irregular shapes in the unprocessed state, wherein the food products may be brought into a predefined and/or standardized shape by a compression by such a pressing device in order to enable further processing steps. For example, provision may be made in order to, for instance, bring frozen fresh meat products or bacon into a rectangular shape by such a pressing device in order to, for example, be able to package the products standardized in this manner or to cut them into similar slices by a slicing apparatus to be able to create portions from the slices and then to package these portions.

In this regard, such a pressing device may in particular be provided as a component of a processing line so that the products compressed by the pressing device may be transferred to further processing apparatus and processed further there. These further processing apparatus may, for example, adjoin the pressing device along the line in the longitudinal direction of the pressing chamber so that a compressed product may, for example, be conveyed out of the pressing device along the longitudinal direction and be fed to a slicing apparatus to be cut into slices by the latter.

In particular in view of such a frequent use of pressing devices in a processing line, it is necessary in the design of such a pressing device to implement as narrow as possible a design to consider the frequently limited space conditions and to enable comfortable access to the pressing device and in particular to the pressing chamber. However, a certain size of the pressing device and in particular a certain width of the pressing device may already be predefined in that the at least one pressing member has to be movable. For this purpose, the drive also has to be arranged at the pressing device, wherein the arrangement of components of the drive may possibly result in a further increase in size of the pressing device in the direction of travel of the pressing member and in particular in the width of the pressing device. To minimize such an increase, drives having complex deflections may be provided in order to, for example, be able to deflect a linear movement generated by the drive transversely to a direction of travel of the pressing member. However, this may involve a complex and therefore expensive design of the drive, wherein the deflections may furthermore reduce the efficiency of the drive.

It is therefore an object of the invention to provide a pressing device for pressing meat products whose pressing member may be driven by a drive that is in particular narrow in the direction of travel.

This object is satisfied by a pressing device having the features of claim 1.

The drive of the pressing device is configured to drive at least one eccentric cam, which is rotatable about an axis of rotation, in order to move the pressing member from the starting position into the end position, wherein the pressing member may be movable from the starting position into the end position by a rotation of the eccentric cam of more than 90 degrees. Provision may in particular be made that the pressing member may be moved from the starting position into the end position by a rotation of the eccentric cam of more than 120°. Furthermore, in some embodiments, the eccentric cam may be movable from the starting position into the end position by a rotation about 180°.

The starting position and the end position may in particular represent respective maximum positions of the pressing member, wherein the pressing member may be moved the furthest away from the counter-element in the starting position and may be moved the furthest towards the counter-element in the end position. For example, provision may be made that the product may be inserted into the pressing chamber in the starting position of the pressing member, while the product is compressed to the maximum in the end position of the pressing member.

Since the pressing member may be moved from a starting position into the end position by a rotation of the eccentric cam of more than 90°, and in particular by a rotation about 180°, as large as possible a multiple of the eccentricity of the eccentric cam may in particular be used to move the pressing member. In particular on a rotation about 180°, the pressing member may be moved by twice the eccentricity so that a comparatively large travel distance may be achieved with only a comparatively small eccentricity. For example, the eccentric cam may have an eccentricity of approximately 75 mm, wherein a travel distance of 150 mm may be achieved by a rotation of the eccentric cam about 180°.

Since the required travel distances may thus be achieved with only a small eccentricity of the eccentric cam, the drive likewise only has to apply small torques to be able to apply a certain force to the pressing member. In particular, in comparison with an eccentric cam that may only be rotated about at most 90°, on a rotation about 180°, half the torque has to be applied to be able to apply the same force with the same travel distance.

Furthermore, the driving of the pressing member by an eccentric cam makes it possible to drive the eccentric cam directly by a rotating motor and to convert the rotation of the motor into the linear movement of the pressing member by only one transmission at the eccentric cam. Further transmissions between linear movements and rotational movements, which may lead to a reduction in efficiency, are therefore also not required. This may, for example, be achieved in that the eccentric cam is rotated directly by a rotating drive without, for example, being driven by a hydraulic cylinder that generates a linear movement. In the case of such a driving of an eccentric cam in that, for example, a connecting rod driven by a hydraulic cylinder engages radially outwardly at an eccentric disk, the eccentric cam may, in contrast, only be driven over a comparatively small angular region in which the connecting rod is arranged approximately tangentially to the eccentric disk. A rotation of the eccentric cam about more than 90° is therefore not possible in such solutions so that a greater eccentricity of the eccentric cam is required to achieve the desired travel distance of the pressing member.

Furthermore, the driving of the pressing member by an eccentric cam that is rotatable about more than 90°, and in particular 180°, and the associated small eccentricity required make it possible to use comparatively simple gears having only small gear ratios to generate the required force. The pressing device may thereby be configured as more favorable and simpler overall. For example, the eccentric cam, which may in particular be configured as an eccentric disk, may be connected to a rotating motor via a simple planetary gear set in order to generate the travel movement of the pressing member.

Further embodiments can be seen from the dependent claims, the description, and the drawings.

In some embodiments, the drive may comprise an electric motor that is configured to drive the eccentric cam. The electric motor may in particular be configured to move the pressing member by driving the eccentric cam to perform a rotation about more than 90°, in particular more than 120°, preferably to perform a rotation of 180°, from the starting position into the end position.

Such an electric motor may in particular be configured to drive a motor shaft directly to perform a rotational movement, wherein the rotation of this motor shaft may be transmitted to the eccentric cam without a prior transformation into a linear movement. Losses arising due to such conversions between rotational movements and linear movements may consequently be avoided by such a direct driving of the eccentric cam. Furthermore, the large angle of rotation of the eccentric cam makes it possible to achieve the total required travel distance of the pressing member by an eccentric cam having a comparatively small eccentricity so that the comparatively small torques may also be generated by fast-rotating electric motors of a small design. An overall space-saving design of the pressing device may thereby again be achieved.

In some embodiments, the electric motor may be configured as a servomotor. Such a servomotor may in particular enable a precise process control in that, for example, positions into which the pressing member is to be moved during a pressing may be precisely predefined and may be controlled by the servomotor. In this respect, the servomotor may in particular be a component of a servo drive for moving the pressing member, wherein the servo drive may, in addition to the servomotor, comprise a servo inverter having power electronics and a regulation. An intentional movement of the pressing member may thereby be made possible, wherein the servomotor may in particular be position-regulated, torque-regulated, and/or speed-regulated.

In some embodiments, the axis of rotation of the eccentric cam may correspond to a motor axis of rotation about which a motor shaft of the electric motor is rotatable. Alternatively thereto, the axis of rotation of the eccentric cam may be aligned in parallel with the motor axis.

Since the axis of rotation of the eccentric cam may correspond to a motor axis, the electric motor and the eccentric cam may in particular be arranged along the axis of rotation of the eccentric cam to be able to implement a radially narrow design of the drive for the pressing member with respect to the axis of rotation. In this respect, the axis of rotation of the eccentric cam may, for example, correspond to the motor axis when a rotation of the electric motor is directly conducted to the eccentric cam. However, the axis of rotation of the eccentric cam may in particular be oriented slightly offset with respect to the axis of rotation of the motor when the eccentric cam is, for example, coupled to the electric motor via a gear. In such a parallel orientation, the electric motor and the eccentric cam may, however, also be oriented along the axis of rotation so that the extent of the drive may be substantially concentrated in the direction defined by the axis of rotation.

In some embodiments, the rotation of the motor shaft may be convertible into a rotation of the eccentric cam without a deflection into a translatory movement. As already explained, the efficiency of the drive may in particular be increased in that the rotation of the motor shaft, apart from any transmission stages, may be directly converted into a rotation of the eccentric cam. Any losses, for instance due to a driving of the eccentric cam by a drive generating a linear or translatory movement, may thereby be avoided.

In some embodiments, the eccentric cam may be connected to the electric motor via a gear, in particular a reduction gear. A reduction gear may in particular be such a gear in which an incoming rotational speed is output slowed down. The gear and in particular the reduction gear unit may, for example, be a planetary gear set.

Since the eccentric cam is connected to the electric motor via such a gear, a torque transmitted to the eccentric cam may in particular be increased, for which purpose a rotation of the motor shaft may be transmitted slowed down to the eccentric cam. This may, for example, make it possible, to use fast-rotating electric motors to drive the pressing member, wherein, due to the comparatively small torque to be generated by the eccentric cam, comparatively less complex gears may, so to speak, be used to achieve the speed reduction required. An overall cost-effective design of the drive for the pressing member may thereby be achieved.

The gear may be arranged coaxially to the electric motor and the eccentric cam in some embodiments. The electric motor, the gear, and the eccentric cam may in particular be arranged behind one another with respect to the axis of rotation in some embodiments. With regard to a coaxial arrangement of the gear, the electric motor, and the eccentric cam, the gear may in particular be arranged coaxially to a motor shaft of the electric motor and a center of an eccentric disk. The electric motor, the gear, and the eccentric cam may furthermore be arranged behind one another, viewed along the axis of rotation of the rotor. As already explained, due to such an arrangement, the drive may mainly extend along the axis of rotation of the eccentric cam and/or of the electric motor in order to radially minimize the required installation space with respect to this axis of rotation.

In some embodiments, the eccentric cam may be connected to the pressing member via a sliding element, wherein the sliding element may be configured to slide off at the pressing member transversely to the pressing direction during the movement of the pressing member.

Since the eccentric cam performs a rotational movement to linearly move the pressing member, the eccentric cam or a point of engagement of the eccentric cam at the pressing member moves transversely to the pressing direction relative to the pressing member during the movement. To enable such a movement, the eccentric cam may be connected to the pressing member via a sliding element that may be movable in the pressing direction with the pressing member, but may be movable transversely to the pressing direction relative to the pressing member. The pressing member may thereby be prevented from being deflected transversely to the pressing direction during a rotation of the eccentric cam.

The eccentric cam may directly mechanically contact the pressing member in some embodiments. Due to such a direct mechanical contact between the eccentric cam and the pressing member, the rotation of the eccentric cam may again be directly converted into a translatory movement or a linear movement of the pressing member for pressing the product. Further transmission stages, which may lead to a reduction in efficiency, are therefore not required. If necessary, a sliding element may, however, be fastened to the eccentric cam, said sliding element being configured to slide off at the pressing member transversely to the pressing direction during the movement of the pressing member, as explained above. Furthermore, the eccentric cam may engage at the pressing member via a coupling rod, as will be described below.

In some embodiments, the eccentric cam may have an eccentricity in a range from 50 mm to 100 mm, in particular in a range from 70 to 80 mm. In particular on a rotation of the eccentric cam about 180°, a sufficient travel distance for the pressing member may already be covered with such a small eccentricity to be able to achieve the compressions required in the field of the processing of meat products.

The axis of rotation of the eccentric cam may be oriented perpendicular to the pressing direction in some embodiments. Alternatively or additionally, in some embodiments, the axis of rotation may be oriented perpendicular to the longitudinal direction.

For example, the drive may be provided to drive a pressing member that may be moved transversely and in particular perpendicular to the longitudinal direction. Such a pressing member movable transversely to the longitudinal direction may in particular first be moved during a pressing process so that the pressing forces to be applied by this pressing member may be comparatively small since the product may, for example, yield and expand in the longitudinal direction. However, the eccentric cam may, for example in the end position, be oriented along the pressing direction so that subsequently, for example during a movement of further pressing member, forces applied to the product do not develop a torque on the eccentric cam and the pressing member may also withstand these increased forces. Furthermore, since the axis of rotation may be oriented perpendicular to the pressing direction, the installation space required for the drive in the pressing direction may be minimized. In particular in the case of a pressing member movable transversely to the longitudinal direction, the extent of the pressing device transverse or perpendicular to the longitudinal direction may thereby be minimized overall.

The axis of rotation of the eccentric cam may be oriented along the vertical in some embodiments. Due to such an axis of rotation of the eccentric cam, the electric motor and, if necessary, a gear may be oriented along the vertical in particular in embodiments in which an electric motor driving the eccentric cam is also oriented coaxially to the eccentric cam. In particular, such a gear and the electric motor may be arranged beneath the eccentric cam along the vertical so that the drive of the pressing member may overall be arranged below the eccentric cam. Since the axis of rotation may further in particular be oriented perpendicular to the pressing direction to be able to transform a transmission of a rotation of the eccentric cam into a travel movement of the pressing member taking place in the pressing direction, the drive required for generating the travel movement of the pressing member may thus so-to-say be stowed beneath the eccentric cam and/or the pressing member. Since the pressing device, however, anyway has to have a certain height to enable a comfortable operation, this space that is thus so-to-say anyway required may be used to arrange the drive there. In contrast, the arrangement of the drive does not require any or at least only a minimal increase in the size of the pressing device in the horizontal direction and/or in the pressing direction.

In some embodiments, the drive may be held by the pressing member. In some embodiments, the drive may in particular extend beneath the pressing member and be held by the pressing member. The drive may thus, for example, not be supported at a lower side at a housing of the pressing device, but may so-to-say be suspended above such a housing base.

In some embodiments, the drive may be supported via a torque support at a housing of the pressing device. Such a torque support may in particular be supported in a housing and in a gear of the drive. The drive may further be fastened to the housing only by the torque support in some embodiments.

Since the drive may only be fastened to the housing by the torque support, a tolerance compensation, for example between bearings of a gear of the eccentric cam and/or of an electric motor, may in particular be made possible in that these components may be deflected slightly with respect to one another. However, any torques acting on the drive during the pressing due to a force from the product counteracting the pressing may be led off to the housing via the torque support to counteract damage to the drive.

In some embodiments, the eccentric cam may engage centrally at the pressing member. In some embodiments, only a single eccentric cam may in particular be provided to drive the pressing member, wherein this eccentric cam may engage centrally to be able to apply the pressing force to the product in as centered a manner as possible. Any torques may hereby be avoided as far as possible.

In some embodiments, the eccentric cam may be connected to a further eccentric cam via a coupling rod, wherein the eccentric cam and the further eccentric cam may engage at the pressing member at points of engagement spaced apart transversely to the pressing direction. Such a coupling rod may in particular make it possible to absorb counter-forces transmitted from the product to the pressing member during a pressing process and to enable a torque compensation to prevent an unwanted deflection of the pressing member transverse to the pressing direction. The pressing member may so-to-say be advanced by the two eccentric cams at two spaced-apart points of engagement and may thereby be stabilized with respect to deflections transverse to the pressing direction.

In some embodiments, the drive may be configured to drive the further eccentric cam. Both the eccentric cam and the further eccentric cam may thus in particular be drivable by the common drive so that the drive may be configured to transmit a force to the pressing member at both points of engagement. Consequently, no separate drives are required to drive the two eccentric cams so that the number of components required and correspondingly the installation space required may be minimized. The electric motor already mentioned may in particular be configured to drive the eccentric cam and the further eccentric cam. A single electric motor may thus be provided to drive both eccentric cams and thus to transmit a force at both points of engagement.

In some embodiments, the further eccentric cam may be rotatable about an axis of rotation that is aligned in parallel with the axis of rotation of the eccentric cam. Furthermore, the eccentric cam and the further eccentric cam may basically be of the same design. In this regard, a basically identical movement and/or force may be transmitted to the pressing member at the two points of engagement by jointly rotating the eccentric cam and the further eccentric cam so that the deflection of the pressing member transverse to the pressing direction may be avoided.

In some embodiments, an eccentricity of the eccentric cam may correspond to an eccentricity of the further eccentric cam. Both points of engagement at which the eccentric cams engage at the pressing member may thus in particular be movable by the same travel distance when the eccentric cam and the further eccentric cam are rotated.

Furthermore, the eccentric cam and the further eccentric cam may be aligned in parallel with one another. In this regard, in every rotational position during the movement of the pressing member, an orientation of the further eccentric cam may correspond to an orientation of the eccentric cam. Furthermore, the further eccentric cam may be rotatable by the same angle of rotation as the eccentric cam during a movement of the pressing member from the starting position into the end position.

In some embodiments, a lower eccentric cam may be arranged coaxially to the eccentric cam, wherein the drive may be configured to drive the lower eccentric cam. The lower eccentric cam may in particular be arranged between the eccentric cam and an electric motor for driving the eccentric cam and the lower eccentric cam. In this regard, the term lower is here generally to refer to the axis of rotation. In particular in a vertical orientation of the axis of rotation of the eccentric cam, the lower eccentric cam may, however, also be arranged vertically below the eccentric cam.

The lower eccentric cam may be oriented offset by 90° from the eccentric cam in some embodiments. The lower eccentric cam may therefore in particular be oriented offset by 90° from the pressing direction, for example, in a rotational position of the eccentric cam in which the eccentric cam is aligned in parallel with the pressing direction. This may in particular enable a reliable compensation of torques transmitted to the pressing member during the pressing process, as explained further below.

In some embodiments, the lower eccentric cam may be connected to a further lower eccentric cam via a further coupling rod, wherein the further lower eccentric cam may be oriented coaxially to and offset by 90° from the further eccentric cam. Since the eccentric cam may thus be connected to a further eccentric cam via a coupling rod and the lower eccentric cam may be connected to a further lower eccentric cam via a further coupling rod, respective torques transmitted to the pressing member and thus to the coupling rod and the further coupling rod may be transmitted to the respective eccentric cams via the coupling rod and the further coupling rod and may thereby be compensated. Due to the orientation of the lower eccentric cam offset by 90° from the eccentric cam and the orientation of the further lower eccentric cam offset by 90° from the further eccentric cam, it may further be achieved that in a position in which the eccentric cam and the further eccentric cam are aligned in parallel with the coupling rod and no torques may be distributed via the coupling rod between the eccentric cam and the further eccentric cam, the lower eccentric cam and the further lower eccentric cam are just perpendicular to the further coupling rod so that a compensation of torques may reliably take place via the further coupling rod. In this regard, due to such a configuration of the pressing device with two respective pairs of eccentric cams that are arranged offset by 90° from one another, a reliable torque compensation may take place in every position of the pressing member to prevent an unwanted deflection of the pressing member.

The further coupling rod may be curved in some embodiments. Such a curved design may in particular make it possible to guide the coupling rod around a respective shaft, which extends to the eccentric cam and the further eccentric cam, during a rotation of the lower eccentric cam and the further lower eccentric cam.

In some embodiments, the pressing direction may be oriented perpendicular to the longitudinal direction. The pressing member drivable by the eccentric cam may thus in particular be provided to compress the product inserted into the pressing chamber perpendicular to the longitudinal direction. Such a pressing member may in particular also be designated as a width punch or a cross punch. Furthermore, the longitudinal direction may generally extend along the direction in which the pressing chamber has the greatest extent. Thus, in particular in a configuration for moving a pressing member perpendicular to the longitudinal direction, a narrow design of the drive also enables a narrow design of the pressing device overall perpendicular to the longitudinal direction.

In some embodiments, the pressing member may comprise a carriage, wherein the carriage may be arranged above the eccentric cam in the starting position. The carriage may thus so-to-say form a housing for the eccentric cam and cover the eccentric cam. This may also enable a compact arrangement and a direct engagement of the eccentric cam at the pressing member or at the carriage.

In some embodiments, the eccentric cam may be accessible for a cleaning without a removal of the carriage in the end position of the pressing member. In particular, the eccentric cam may be accessible for a cleaning without a removal of components, in particular movable components, of the pressing member in the end position.

In such embodiments, the carriage thus does not have to be removed to be able to clean the eccentric cam or the drive. Any maintenance work at the eccentric cam and/or at the drive may also take place without the carriage having to be removed. This may represent a significant simplification of such work since the carriage of such a pressing member may often weigh approximately 100 kg so that a manual removal is not possible.

In some embodiments, the pressing device may comprise a protective cover for the carriage, wherein the protective cover may be removable without tools. The protective cover may in particular be provided to cover the carriage and, for example, to protect it against contamination when a product is inserted into the pressing chamber via the pressing member. Since the protective cover may be removable without tools, access to the eccentric cam, which is, for example, arranged beneath the carriage, may, however, in particular be made possible to be able to maintain and/or clean the eccentric cam and/or the drive. Furthermore, the protective cover may be provided to prevent a manual intervention in the pressing member, in particular in the region of the starting position, and thereby possible injuries to a user.

In some embodiments, the protective cover may be fixed to a housing of the pressing device, wherein the pressing member may be movable out of the protective cover in the pressing direction. Thus, the protective cover may in particular not be displaced during a pressing process.

The protective cover may be pivotable relative to the pressing member in some embodiments. The protective cover may in particular be pivotable relative to the pressing member to enable access to the pressing member, the eccentric cam, and/or the drive to be able to service and/or clean said components. For this purpose, the protective cover may, for example, be pivotable about a horizontally oriented pivot axis.

In some embodiments, the protective cover may be removable from the pressing device in a removal position, in particular by pushing. For example, provision may be made that the protective cover is held in a housing of the pressing device by a pin, but is pivotable about this pin. During a pressing process, the protective cover may cover the pressing member and may engage behind a securing means with a tab, through which the pin engages, to be clamped between a fastening of the pin to the housing and the securing means. By pivoting the protective cover about 90°, the tab may, in contrast, be transferrable into a position in which the tab is arranged out of alignment with the securing element so that the protective cover may, by pushing away from the pin, be pushed over the securing element and may be released from the pressing device. Such a removal may further facilitate access to the components covered by the protective cover during the pressing, in particular the pressing member, the eccentric cam, and/or the drive. Furthermore, the protective cover may be removable from the pressing device without tools and may be insertable into the pressing device again without tools.

In some embodiments, the protective cover may comprise a safety circuit that is configured to detect when the protective cover covers the pressing member. Due to such a safety circuit, it may in particular be ensured that the protective cover is correctly arranged before the start of a pressing process to prevent any injuries to a user when accessing the pressing member. In this regard, the safety circuit may in particular detect an end point of a pivot movement by which the protective cover may be movable relative to the pressing member.

In some embodiments, the pressing device may further comprise a lateral guide for the pressing member. The pressing device may in particular comprise lateral guide rods for the pressing member. The lateral guide and/or the lateral guide rods may be spaced apart transversely to the pressing direction and may extend along the pressing direction to provide a reliable guidance of the pressing member during the pressing process. The possibilities already mentioned for absorbing any torques acting on the pressing member may in particular also serve to prevent a straining of such lateral guides and/or guide rods.

In some embodiments, a force of less than 2 kN and/or more than 0.8 kN may be transmittable to the pressing member by the drive. Such a force may in particular be sufficient for moving a pressing member to be moved first in order to press a meat product, in particular a frozen or partly frozen meat product, and for achieving a compression, in particular transversely to a longitudinal direction. Due to an orientation of the eccentric cam in the end position, for example, along the pressing direction, no radial forces may, however, be transmitted to the eccentric cam during a subsequent pressing in further directions so that the eccentric cam and the drive may withstand such pressing forces in this position.

Furthermore, in some embodiments, the pressing member may comprise a pressing tool that may be coupled to the carriage, wherein the pressing tool may be connectable to the carriage and/or releasable from the carriage, in particular without tools. For example, the pressing tool may be connectable to the carriage by a plug-in connection.

Since the pressing member may have a pressing tool that may be coupled to the carriage, a spacing between the counter-element and the pressing member may in particular be adapted in order to, for example, be able to process products of different sizes in the pressing device. Here, it is possible to flexibly react to different product requirements due to the possibility of removing and/or inserting the pressing tool without tools. The size of the pressing tool along the pressing direction may in particular define a size of the completely pressed product in the pressing direction so that different results may be achieved by respective pressing tools. In particular, due to such a pressing, an adaptation may take place to a packaging machine arranged downstream that may, for example, provide packaging spaces of a predefined size into which the pressed products and/or further processed versions of the pressed products, for example cut-off slices, may be inserted. Furthermore, different pressing tools may be connectable to the pressing device in order to, for example, be able to achieve a desired shape of the compressed product, for example a rounded shape.

The invention further relates to a pressing device for pressing meat products, in particular frozen and/or partly frozen meat products, preferably fresh meat products and/or bacon, comprising a pressing chamber which extends along a longitudinal direction and into which a product to be pressed may be inserted. In this respect, the pressing chamber comprises at least one counter-element and a pressing tool that may be moved in the direction of the counter-element in order to compress the product, wherein the pressing tool may be removed from the pressing tool and/or may be inserted into the pressing chamber without tools. As already explained, due to such a tool-free removal, the pressing device may be flexibly adapted in a simple manner to different products to be processed. For example, differently shaped pressing tools may be inserted into the pressing chamber to be able to act on a shape of the compressed product. Furthermore, a size of the compressed product may, for example, be influenced by an appropriately selected extent of the pressing tool in a pressing direction in which the pressing tool may be moved.

In some embodiments, the pressing tool may be connectable to a movable carriage without tools. In this regard, the carriage may represent a component which generally remains in the pressing device and to which the pressing tool may be flexibly couplable.

In some embodiments, the pressing tool may have a marking based on which the pressing tool may be identified. For example, the pressing tool may have a label and/or a coding to identify the respective pressing tool. For example, an extent of the pressing tool in the pressing direction, a shape, a weight, and/or a type, for example a serial number, of the pressing tool may be identifiable based on the marking.

In some embodiments, the pressing device may comprise a plurality of pressing tools selectively insertable into the pressing chamber, wherein each of the pressing tools may have an individual marking. In this regard, different pressing tools may be flexibly inserted into the pressing device to achieve a desired result of the pressing process. Since each of the pressing tools may have an individual marking, it may be checked which pressing tool is currently inserted into the pressing device to be able to control the pressing process accordingly, if necessary. For example, different end positions may be provided for different pressing tools and/or different pressing forces.

In some embodiments, the pressing device may have a readout device that is configured to read out the marking. For this purpose, each of the pressing tools may, for example, be configured with an RFID chip, wherein the readout device may be configured to read out such an RFID chip. Since the pressing device has a readout device that may read out the marking, information as to which pressing tool is currently being used may also be transmitted to the pressing device. This makes it possible, for example, to display information to a user about settings and/or controls of the pressing process to be carried out or to automatically carry out such settings and/or controls.

In some embodiments, the readout device may be connected to a control device, wherein the control device may be configured to adapt a pressing process in dependence on the read-out marking. For example, the readout device and/or the control device may be configured to identify the respective tool based on the marking so that the control device may consider the respective pressing tool used and may perform the pressing process adapted thereto. In this regard, an optimally adapted control may take place automatically and any incorrect settings may be avoided. The control device may, for example, comprise a microprocessor, a microchip, and/or a CPU.

As regards possible dimensions of the pressing device, in particular in accordance with the possible embodiments explained above and/or in accordance with the embodiment described in more detail below with reference to the Figures, the pressing device may have one or more of the following features, wherein these features, unless otherwise stated, may in particular be implemented in those embodiments of a pressing device that serve for pressing bacon:

The pressing device may be designed for maximum product dimensions with a product width of approximately 350 mm extending perpendicular to the longitudinal direction, a product length of approximately 800 mm extending in parallel with the longitudinal direction, and a product height of approximately 150 mm.

As regards the external dimensions of the pressing device, it may have a width of approximately 100 cm and a length of approximately 270 cm. A width of approximately 100 cm, which is comparatively narrow, may in particular be achieved by the kind of drive disclosed herein for the pressing member movable in the direction of the width and it may also be advantageous in another aspect, in particular an aesthetic aspect, namely in particular when other components of a processing line have at least approximately the same width. Known bacon slicers, for example, likewise have a width of approximately 100 cm so that the pressing device disclosed herein may optimally fit into a corresponding processing line.

The pressing device may also be implemented with a width of up to approximately 130 cm to 140 cm to be able to compress wider products, such as may, for instance, be required for compressing bacon in the US market. A length of 270 cm is relatively small compared to known pressing devices having similar performances and for similar applications so that space may be saved in the longitudinal direction. The loading height, i.e. that height to which a user at least has to raise a product to be compressed in order to insert it into the pressing chamber of the pressing device, may be in the range from approximately 100 cm to 120 cm above the ground, in particular depending on the setting of vertically adjustable feet with which the pressing device stands on the ground. This relatively low loading height, which is ergonomically favorable and thus relieves the user, may also be achieved by the kind of drive disclosed herein for the pressing member movable in the direction of the width. This loading height may be defined by the upper side of a protective cover, in particular a pivotable and/or removable protective cover, for the pressing member movable in the direction of the width when the loading takes place over this protective cover.

The pressing member for compressing the products in the different directions may be adapted such that it may permanently withstand maximum loads as follows: compressing in the vertical direction: approximately 25 tons, i.e. approximately corresponds to a force of 250 kN; compressing in the longitudinal direction: approximately 4 tons, i.e. approximately corresponds to a force of 40 kN; compressing in the width direction, i.e. perpendicular to the longitudinal direction: approximately 8 tons, i.e. approximately corresponds to a force of 80 kN.

Regarding the aspect of a pressing device comprising a pressing tool that can be removed from the pressing chamber and/or that can be inserted into the pressing chamber without tools, the invention may in particular be realized as one of the following embodiments:

1. A pressing device (11) for pressing meat products, in particular frozen and/or partly frozen meat products, preferably fresh meat products and/or bacon, comprising a pressing chamber (13) which extends along a longitudinal direction (L) and into which a product to be pressed can be inserted, in particular in accordance with any one of embodiments described above,
   wherein the pressing chamber (13) comprises at least one counter-element (31) and a pressing tool (101) that can be moved in the direction of the counter-element (31) in order to compress the product,
   wherein the pressing tool (101) can be removed from the pressing chamber (13) and/or can be inserted into the pressing chamber (13) without tools.
2. A pressing device (11) in accordance with embodiment 1,
   wherein the pressing tool (101) can be connected to a movable carriage (99) without tools.
3. A pressing device (11) in accordance with embodiment 1 or embodiment 2,
   wherein the pressing tool (101) has a marking (107) based on which the pressing tool (101) can be identified.
4. A pressing device (11) in accordance with embodiment 3,
   wherein the pressing device (11) has a readout device (111) that is configured to read out the marking (107).
5. A pressing (11) in accordance with embodiment 4,
   wherein the readout device (111) is connected to a control device (53),
   wherein the control device (53) is configured to adapt a pressing process in dependence on the read-out marking (107).
6. A pressing device (11) in accordance with any one of the embodiments 3 to 5,
   wherein the pressing device (11) comprises a plurality of pressing tools (101) selectively insertable into the pressing chamber (13), wherein each of the pressing tools (101) has an individual marking (107).

The invention furthermore relates to a pressing device for pressing meat products, in particular frozen and/or partly frozen meat products, preferably fresh meat products and/or bacon. The pressing device comprises a pressing chamber which extends along a longitudinal direction and into which a product to be pressed may be inserted through an entrance along an insertion direction.

Such pressing devices may be provided to compress meat products and thereby to bring them into an intended shape in order to, for example, be able to feed these meat products to subsequent processing steps in an intended or required shape. Different meat products to be processed may, as natural products, in particular have irregularly different shapes and/or sizes, wherein the meat products may be brought into a standardized shape by the pressing in order to, for example, be able to be offered for sale in this way.

Furthermore, provision may be made to prepare the meat products for further processing steps by the pressing device in that, for example, bacon may be brought into an approximately parallelepiped shape in the pressing device in order to, for instance, be able to cut off rectangular slices from the bacon by a slicing apparatus connected downstream. The slices may then be assembled to form portions and may be transported to a packaging machine arranged downstream by which the portions may be packaged. In this regard, the pressing may represent one of a plurality of processing steps of such a processing line for processing meat products, wherein further processing steps may in particular be arranged downstream of the pressing process.

In order in particular also to be able to compress frozen and/or partly frozen meat products by the pressing device, comparatively high pressing forces are required. To reliably prevent any injuries due to an incautious reaching into the pressing chamber during a pressing process, it is therefore usually necessary to securely close the pressing chamber and in particular the entrance before starting a pressing process. For this purpose, the entrance may, for example, be closed by a movable cover. However, such a closing of the entrance by a stable and therefore heavy cover complicates the operation and ergonomics of such a pressing device since a user has to loosen the cover and open the entrance before each insertion of a product in order thereupon to have to close the cover again to start a pressing process. The time required for pressing a product is also extended by this process. Nevertheless, it is necessary to avoid an unauthorized intervention during the pressing through the entrance through which products may in particular be manually inserted into the pressing chamber.

It is therefore an object of the invention to provide a pressing device that offers a high level of security with respect to unauthorized interventions into the pressing chamber with a comfortable handling and a fast operability.

This object is satisfied by a pressing device in accordance with any one of the embodiments explained below.

The pressing device comprises an entrance control device that is configured to detect an object located in the entrance and to transmit a corresponding detection signal.

Since the pressing device has such an entrance control device, it is not absolutely necessary to completely secure the entrance against access by a closing in order to be able to perform a safe pressing process. Rather, the entrance control device makes it possible to detect when an object and, for example, an arm or a hand of the user is located in the entrance and an intervention into the pressing chamber is thus imminent.

Furthermore, it may be checked whether an unwanted object enters the pressing chamber through the entrance during the pressing process in that the entrance control device may, for example, transmit the detection signal at the moment at which the object passes through the entrance. Any disturbances of the pressing process by other objects entering the pressing chamber, for example tools or contamination, which could also result in damage to the pressing device, may therefore also be avoided.

Basically, for pressing devices for meat products and in particular pressing devices in the food sector, the invention thus turns away from the conventional approach for securing the pressing process according to which an intervention into the pressing chamber during the pressing process is mechanically prevented, and is thus made practically impossible, and the pressing chamber and an entrance for inserting a product into the pressing chamber are so-to-say mechanically blocked during the pressing process. In contrast, the pressing device disclosed herein follows the concept of not necessarily closing the entrance, but of checking whether an object is located in the entrance or passes through the entrance to engage into and/or enter the pressing chamber. This then makes it possible to react to the corresponding detection signal and, if necessary, to adapt and/or to stop the pressing process so that, despite the access through the entrance and/or into the pressing chamber, an injury to a user and/or a disturbance of the pressing process may be reliably avoided.

As already explained, the pressing device disclosed herein thus makes it possible in principle to leave the entrance open during the pressing process and thus to generally enable access to the pressing chamber. Since it may thus be ensured by this checking of movements into the pressing chamber and/or through the entrance that such an intervention does not take place or that the pressing process is, if necessary, adapted accordingly to avoid injuries, it is not necessary to close the entrance mechanically, in particular by a protective cover that is difficult to handle and/or solid. The operation and handling of the pressing device may thereby be made much more comfortable and the pressing process may be take place in an accelerated manner in that these work steps may generally be saved.

Advantageous embodiments are explained the following description and in the Figures.

In some embodiments, the entrance control device may comprise a light barrier and may be configured to transmit the detection signal on an interruption of the light barrier.

Thus, the entrance control device may in particular be configured to transmit a light beam in a plane through which the product has to be moved to enter the pressing chamber. This light beam may, for example, be detected by a corresponding sensor at a side of the entrance opposite a light source of the light barrier or may be reflected back to the side of the light source and detected there. If an object is located in the entrance, this object may thus be located between the light source and the sensor, i.e. in general between the oppositely disposed sides of the entrance, so that the presence of an object in the entrance may be associated with an interruption of the sensor, i.e. in general of the light barrier. Accordingly, the entrance control device may consequently transmit the detection signal.

Furthermore, in some embodiments, the entrance control device may be configured to generate a light grid along the entrance and to transmit the detection signal on an interruption of the light grid.

The entrance control device may in particular be configured to generate a light grid in a plane oriented transversely to the insertion direction so that an object entering the pressing chamber has to pass through this plane and the light grid is interrupted in such a case. For example, the light grid may be formed by a plurality of light beams transmitted in parallel along the entrance and, for example, from one side of the entrance to an opposite side of the entrance so that the light grid may, for example, be formed by a plurality of parallel light beams. Alternatively thereto, the light grid may, however, also comprise further light beams that are oriented perpendicular to these light beams and that, for example, extend from an upper side to a lower side of the entrance. A light grid composed of light beams extending only from top to bottom and in parallel with one another may also be provided.

To detect an interruption of the light grid, the entrance control device may further comprise light sensors or reflectors arranged opposite respective light sources that transmit said light beams. The spacing between respective beams of the light grid may in particular be dimensioned such that at least one human finger arranged in the entrance may be reliably detected. An arrangement of the light beams such that a hand and/or an arm may be reliably detected may also be provided. In general, the safety may be further increased by increasing the number of light sources and light sensors and thus by reducing the spacing between respective light beams of the light grid. The light grid may in particular be oriented in a plane perpendicular to the insertion direction.

In some embodiments, the entrance control device may comprise a plurality of light sources that are configured to transmit a respective light beam from one side of the entrance transversely to the insertion direction to a second side of the entrance, wherein, at the second side of the entrance, the entrance control device may have an associated light sensor or reflector for each of the plurality of light sources, said associated light sensor or reflector being configured to detect the light beam transmitted by the associated light source or to reflect the light beam onto a sensor arranged at the side of the light sources, in particular in the region of the respective light source.

In some embodiments, the entrance control device may further be configured to transmit the detection signal when at least one of the light sensors does not detect a light beam.

In other words, in some embodiments, the entrance control device may comprise a plurality of light barriers, wherein the light beams transmitted by the light sources of the light barriers extend from the first side of the entrance to the second side of the entrance. At the second side of the entrance, the respective light sensors or reflectors of the light barriers may be arranged and the detection signal may be transmitted when at least one of the light barriers is interrupted, whereby it may be recognized that an object is located in the beam path of the respective light barrier.

The respective light beams may each be oriented perpendicular to the insertion direction and/or extend in parallel with one another. Furthermore, the light beams may in particular extend in the horizontal and/or in the vertical.

The light sources may, for example, each be a laser. In general, light sources may be configured to emit electromagnetic radiation, wherein this electromagnetic radiation may be in the visible wavelength range, in the infrared range, and/or in the ultraviolet range. For example, the light sources may be configured as lasers emitting visible red light.

In some embodiments, the light sources may be arranged behind one another, in particular vertically behind one another, at the first side and the light sensors or reflectors may be arranged behind one another, in particular vertically behind one another, at the second side.

The beams transmitted by the light sources may in particular extend in parallel with one another and horizontally, wherein a spacing between the light sources and/or the light beams emitted by the light sources may in particular correspond to a spacing between the light sensors or reflectors at the second side. The spacing between the light sources and/or the light sensors may in particular so-to-say determine a resolution of the entrance control device in that the spacing between the light sources may ultimately define a maximum size of objects that may pass through the entrance unnoticed. In this regard, the spacing between the light sources and/or the light sensors or reflectors may in particular be selected such that at least a manual intervention into the pressing chamber and/or through the entrance may be reliably detected.

In some embodiments, the light sources and the light sensors or reflectors may be arranged in a respective tube or rod. The tube or rod may in particular be made from a material transparent for the wavelength of the light used in each case, preferably from a plastic, Plexiglas, a metal, or a ceramic material. The wavelength of the light used in each case does not have to be in the range visible to the human eye.

The arrangement of the light sources and light sensors or reflectors in such a rod may in particular provide reliable protection of the light sources and light sensors or reflectors against external influences and, for example, moisture. The tube or the rod may furthermore in particular be sealed to prevent an entry of liquid. In particular in such pressing devices for pressing meat products, the possibility for an efficient cleaning is an important aspect, wherein such an encapsulation of the light sources and the light sensors or reflectors may, for example, enable a cleaning by a high-pressure cleaner without light sources and/or light sensors or reflectors being damaged.

In some embodiments, the pressing device may comprise a front frame, in particular a sheet metal frame, by which the light sources and the light sensors or reflectors are shielded at a front side facing away from the pressing chamber. The light sources and the light sensors or reflectors may in particular be protected by such a frame, as already explained, against damage in the course of a cleaning of the pressing chamber and of the pressing device that, due to this protection by a sheet metal frame, may in particular be performed by a high-pressure cleaner and thereby efficiently and quickly. The sheet metal frame may, for example, extend along the first side in front of a tube in which the light sources are arranged and along an upper side of the entrance to the second side in order, there again in front of a tube in which the light sensors or reflectors are arranged, to extend to a lower side of the entrance. Furthermore, such a frame may also provide protection of the light sources and/or light sensors or reflectors during an insertion of a product to be pressed through the entrance or during any maintenance work when working with possibly pointed or heavy tools at the front side.

In some embodiments, the pressing device may further comprise a rear frame, in particular a sheet metal frame, by which the light sources and the light sensors or reflectors are shielded at a rear side facing the pressing chamber. Due to such a rear frame, protection of the light sources may in particular be achieved when components included in the pressing chamber, in particular movable pressing tools, are removed from the pressing chamber and are exchanged, for example. Such pressing tools may, for example, be produced from stainless steel and in a comparatively heavy manner so that the pressing tools may, if necessary, abut the sides of the entrance during a manual removal from the pressing chamber, wherein damage to the light sources and/or the light sensors or reflectors may, however, be prevented by the rear frame. A reliable functioning of the entrance control device may thereby also be ensured. Conversely, the front frame already mentioned above may protect the light sources, for example, during an insertion of pressing tools into the pressing chamber. Pressing tools may in particular be understood as such components of the pressing device that are moved during a pressing process to compress a product arranged in the pressing chamber.

The light sources and/or the light sensors or reflectors may be encapsulated at three sides, in particular in a U shape, in some embodiments. For example, the front frame already mentioned and the rear frame already mentioned may form a front-side and rear-side encapsulation of the light sources and/or the light sensors or reflectors. Furthermore, the light sources may be encapsulated at a side facing away from the light sensors and the light sensors or reflectors may be encapsulated at a side facing away from the light sources by a respective further frame section so that the light sources and the light sensors or reflectors may be encapsulated at three sides in total. A three-sided and/or U-shaped encapsulation in particular makes it possible to transmit the light beams from the light sources at the open side in the direction of the second side of the entrance, wherein the light sensors or reflectors may receive the light beams at the open side and in the direction of the first side, whereas the light sources and the light sensors or reflectors may be completely encapsulated and thereby secured at the remaining three sides at which no light beams are transmitted or received.

It is also possible that a four-sided encapsulation is present, wherein individual passages for the light beams are formed. The light sources and/or light sensors or reflectors are thereby protected from all sides against damage at least by objects that are large compared to the passages.

The entrance control device may ensure intervention protection not only by one or more light barriers or one or more light grids, i.e., alternatively or additionally, the entrance control device may also have one or more other safety devices, as set forth below. The further developments disclosed herein with respect to the light barriers or light grids are then also possible further developments of these other safety devices, and also the manner of the use of the signals disclosed herein may generally likewise take place with these other safety devices.

A pressure mat located on the ground may e.g. be provided in front of the pressing device and detects when a user is standing in front of the pressing device in order then e.g. to suppress certain operating states of the pressing device or to completely prevent a regular operation of the pressing device.

A camera or a system comprising a plurality of cameras may be provided that monitors the intervention region in order to take appropriate measures in the event of a situation endangering the safety or to transmit appropriate signals for this purpose to a control device.

Analogously to the optical mode of operation using light barrier(s) or light grid(s) as disclosed herein, an acoustic curtain or an acoustic grid may be provided that works with sound waves instead of electromagnetic waves. Such an acoustic intervention protection system may e.g. operate in accordance with the principle of the echo sounder to recognize unauthorized objects or objects at unauthorized times at predefined regions of the pressing device.

Devices may be provided for generating electric and/or magnetic fields whose disturbance or change by objects or persons may be recognized and evaluated as an endangerment of the safety in accordance with predefined criteria.

It is also possible to provide sensors that react to heat and that may recognize the presence of a human body or body part to be able to initiate safety measures as required.

Intervention protection may also be provided by a mechanical curtain that may, for example, have a plurality of elements that are arranged, e.g. suspended, in the region of the entrance and that are deflectable, for example elongated, and whose movements may be monitored by suitable sensors and evaluated as an endangerment of the safety in accordance with predefined criteria.

In some embodiments, the pressing device may comprise a state display device that is configured to indicate a readiness state of the pressing device for performing a pressing process, for example, when the entrance control device does not transmit a detection signal.

Such a state display device may, for example, comprise a light source that transmits a signal when no object is located in the entrance and the pressing chamber is therefore free so that a pressing process may be performed. This may indicate to a user that there is no malfunction and that the pressing process may be started. Conversely, the state display device may, for example, be configured to transmit a warning signal when the entrance control device transmits a detection signal. Such a warning signal may, for example, be visually and/or acoustically perceivable. The readiness state may also be indicated in a visually and/or acoustically perceivable manner. For example, the state display device may for this purpose comprise light sources illuminating in different colors and/or a loudspeaker to be able to reproduce a signal tone and/or a signal tone sequence.

In some embodiments, the pressing chamber may comprise at least one counter-element and a pressing member that may be moved in the direction of the counter-element in order to compress the product. The pressing member may in particular comprise a pressing tool already mentioned that may, for example, be connected to a movable carriage, which remains in the pressing chamber, in order to perform the pressing process as desired.

In some embodiments, the product may be insertable into the pressing chamber over the pressing member. The product may in particular be insertable through the entrance and over the pressing member into the pressing chamber. The pressing member may furthermore be movable along the insertion direction to compress the product inserted into the pressing chamber.

Furthermore, in some embodiments, the product may be manually insertable into the pressing chamber. In particular in such embodiments, a manual intervention through the entrance and into the pressing chamber is consequently necessary to insert the product into the pressing chamber. In this regard, the pressing chamber may be directly manually accessible so that an intervention during a pressing process has to be prevented where possible and the pressing process has to be adapted accordingly in the event of an intervention to prevent an injury to the user. Such an intervention may be reliably checked by the entrance control device of the pressing device disclosed herein so that an injury to a user may be prevented.

In some embodiments, the pressing chamber may be accessible through the entrance during the pressing. Thus, in some embodiments, the entrance may in particular not be blocked during the pressing and the pressing device may in particular not comprise a protective cover to block the entrance during the pressing. Furthermore, the pressing device may accordingly not have a control device that checks the closing of the entrance and starts a pressing process only when the entrance is closed. Rather, steps for closing the entrance are not required to start a pressing process, but the safety of the user is rather achieved in that the entrance control device detects an unauthorized intervention into the pressing chamber and the pressing process may be adapted accordingly.

The insertion direction may be oriented transversely to the longitudinal direction in some embodiments. Furthermore, in some embodiments, the insertion direction may be oriented horizontally. The insertion direction may in particular be oriented such that a user may insert the products into the pressing chamber via a narrow side so that the path for inserting a product into the pressing chamber may be minimized and the insertion may thereby be facilitated and accelerated. In this respect, the longitudinal direction may in particular be defined by a direction along which the pressing chamber has the greatest extent. The longitudinal direction will furthermore in particular extend in the horizontal.

The entrance control device may be connected to a control device in some embodiments, wherein the control device may be configured to receive the detection signal and to control a pressing process of the pressing device. The control device may in particular be configured to adapt the pressing process of the pressing device in response to the detection signal. For example, the control device may be configured to slow down and/or stop a pressing process that has already started when the entrance control device transmits a detection signal and an object is located in the entrance. If, for example, a user reaches through the entrance while a pressing process is being performed, the control device may, as a result of the transmitted detection signal, slow down or stop any movable pressing member so that a user may pull the hand or the arm out of the pressing chamber again in good time before an injury or the pressing member may be stopped completely.

The control device may, for example, comprise a microprocessor, a microchip, and/or a CPU.

In some embodiments, the entrance control device may be configured to transmit a release signal when no object is located in the entrance. The control device may further be configured to start the pressing process with a predefined or predefinable time correlation between a detection signal and a subsequent release signal.

The entrance control device may generally be configured to transmit a signal both when an object is located in the entrance and when no object is located in the entrance. However, the release signal may generally also be defined by an absence of a detection signal of the entrance control device.

Due to such a predefined or predefinable time correlation between a detection signal and a subsequent release signal, a process may in particular be described in which a user manually inserts a product into the pressing chamber, and triggers a detection signal in so doing, and thereupon removes the hands from the pressing chamber and the entrance again so that the entrance is released and the detection device transmits a release signal. In this respect, the time correlation may in particular exist between a first detection signal, which is triggered when the entrance control device detects a transition from a state in which no object is located in the entrance to a state in which an object is located in the entrance, and a first release signal which the entrance control device transmits when the entrance is thereupon released again. Furthermore, the time correlation between these signals may be selected in a range that comprises the duration of a typical insertion process of a product into the pressing chamber.

Since the control device may be configured to start the pressing process as a result of such detection signals and release signals detected in a time correlation, the pressing process may in particular be automatically started after the insertion of a product. Further inputs of a user are therefore not required, but the pressing process may start automatically when the product is located in the pressing chamber and the entrance is released again so that there is no danger to the user. In this regard, the configuration of the pressing device with an entrance control device enables an intelligent control of the pressing device so that individual control commands that have to be input separately after the insertion of the product into the pressing chamber may be omitted. The pressing process may thereby also be facilitated and accelerated.

Alternatively or additionally, provision may, however, also be made that the pressing process may be started by an intentional user command. For example, a button and/or a switch may be provided at the pressing device for this purpose, wherein the pressing process may be switched as a result of an actuation of the button and/or switch. Provision may also be made that a user may choose between a control based on the time correlation and a manual or intentional starting of the pressing process. Furthermore, a control may, for example, be provided via a touchscreen.

In some embodiments, the control device may be configured to slow down the pressing process in response to the detection signal. The control device may in particular be configured to slow down an ongoing pressing process in response to the detection signal.

Alternatively, provision may be made already to start a slow pre-positioning of at least one pressing member in response to the detection signal. In this respect, the process may then be accelerated as soon as a release signal takes place. It is also possible to measure at least one dimension of the product and, based thereon, to perform a pre-positioning with a buffer only to the extent that there is no risk of crushing for a user. This measurement of the product may e.g. take place when inserting the product, for example, by a camera or also by the number of interrupted light beams of a light grid, as disclosed herein, when the spacing between the light beams is known. The approximate size of the product may then thereby be inferred. Alternatively, a camera may detect how many points of the interrupted light beams are visible on the product and may in this respect e.g. also include the position of the hands of a user. The recognition of the hands may e.g. be possible by way of a certain glove color.

If the control device receives a detection signal and the information is thereby transmitted to the control device that an object is located in the entrance, the pressing process may thus be slowed down in order in particular to enable a user to pull a hand or an arm out of the pressing chamber again in good time before an injury occurs. However, it is not absolutely necessary to stop the pressing process completely since, in the event of a sufficient slowing down, a then sufficiently fast reaction of the user is reliably made possible. For this purpose, any pressing member may in particular be drivable by drives that may be controlled sufficiently quickly and precisely, for example by electric motors and/or servomotors, or the pressing device may comprise such drives and/or electric motors and/or servomotors.

Furthermore, in some embodiments, the control device may be configured to stop the pressing process in response to the detection signal. In this regard, the control device may also be configured to completely stop an ongoing pressing process when the entrance control device reports a detection signal. A user possibly reaching into the pressing chamber during the pressing process may thereby also be reliably protected against injuries. If necessary, the control device may also be configured first to slow down and finally to stop the pressing process in response to the detection signal if a detection signal is still received after a predefined time and an object is thus still arranged in the entrance.

The invention further relates to a method of controlling a pressing device for pressing meat products, in particular frozen and/or partly frozen meat products, preferably fresh meat products and/or bacon, in particular a pressing device as disclosed herein. In the method, a product is inserted through an entrance into a pressing chamber of the pressing device and the pressing process is started in response to a detection signal of an entrance control device, which is configured to detect an object located in the entrance, and to a subsequent release signal of the entrance control device that indicates that no object is located in the entrance.

As already explained, the pressing process may thereby in particular be automatically started when a product is inserted into the pressing chamber and the entrance is released again by the user so that there is no danger to the user. In this regard, the pressing process may in particular be automatically started in response to the detection signal and the subsequent release signal. Furthermore, provision may be made that the pressing process is only started with a predefined or predefinable time correlation between the detection signal and the subsequent release signal, as already explained above.

Furthermore, in some embodiments, provision may be made that the pressing process is slowed down in response to a further detection signal. An ongoing pressing process may thus in particular be slowed down when a further detection signal is transmitted. Such a further detection signal may indicate that an object is located in the entrance even though the pressing process is still running so that a user could have intervened in the pressing chamber, if necessary. Since the pressing process is, however, slowed down in response to such a further detection signal, a user is, however, enabled to react in order to, for example, pull his/her hand out of the pressing chamber again.

Alternatively or additionally, in some embodiments, provision may be made that the pressing process is stopped in response to the further detection signal. For example, the pressing process may first be slowed down in order, however, to be completely stopped if a detection signal is still transmitted after a predefined or predefinable time. However, provision may also be made that the pressing process is immediately stopped completely and any movable pressing member are stopped as soon as a detection signal is transmitted during an ongoing pressing process and an object located in the entrance is recognized.

The invention further relates to pressing device for pressing meat products, in particular frozen and/or partly frozen meat products, preferably fresh meat products or bacon, comprising a pressing chamber which extends along a longitudinal direction and into which a product to be pressed may be inserted. The pressing chamber comprises a pressing member that may be vertically moved in order to compress the product, wherein the pressing member further comprises a first motor and a second motor that are configured to move the pressing member.

As already explained above, provision may be made in some pressing devices that a product is inserted into the pressing chamber manually and, for example, over a pressing member movable in a horizontal plane. For this purpose, a sufficient free space is, however, required in the vertical direction so that the product may be inserted over the pressing member into the pressing chamber. Such an insertion may in particular take place through the entrance already mentioned above.

Since such a sufficient vertical free space, however, has to be available, the vertically movable pressing member has to bridge this free space during the pressing process to be able to compress the product in the pressing chamber. However, if the pressing member is driven during the entire travel by a motor that only rotates slowly and/or that is slowed down greatly by a corresponding gear, the pressing process may thereby be slowed down inappropriately.

Since, in the pressing device explained above, two motors are, however, provided to drive the vertically movable pressing member, one of the motors may, for example, be configured to move the pressing member quickly, whereas the other motor may be configured to develop the force required for pressing. In this regard, the pressing member may, for example, so-to-say be pre-positioned by the fast-rotating motor, which develops only a small force, after the insertion of the product into the pressing chamber, wherein the other motor that develops a large force, but only moves the pressing member slowly may be used shortly before or as soon as the pressing member comes into contact with the product in order to compress the product. The pressing process may thereby be accelerated.

In some embodiments, provision may in particular be made that the first motor and the second motor are configured to move the vertically movable pressing member vertically downward. In this regard, the first motor and the second motor may in particular pull the pressing member downward.

Furthermore, in some embodiments, provision may be made that the first motor is configured to move the pressing member faster relative to the second motor, wherein the second motor may be configured to develop a greater force relative to the first motor. As already explained, the first motor may be used to move and in particular to pre-position the pressing member quickly, whereas the second motor may be used to move the pressing member during the actual pressing process for compressing the product.

In some embodiments, the pressing device may have a control device that is configured, in order to press the product inserted into the pressing chamber, first to pre-position the pressing member by controlling the first motor and then to compress the pressing member by controlling the second motor. The pre-positioning may in particular comprise moving the pressing member up to and into contact with the product.

In some embodiments, the second motor may be engageable for compressing the product. In such embodiments, the first motor may in particular continue to run during the pressing of the product, wherein the contribution of force transmitted from the first motor during the pressing may be negligible compared to the contribution of the second motor. The second motor may also, if necessary, run during the entire movement of the pressing member, but may only after the pre-positioning of the pressing member be coupled to the pressing member such that a force is transmitted from the second motor to the pressing member.

Within the framework of the present disclosure, "coupling" is generally to be understood both as the establishing (="engaging" or "coupling") and severing (="disengaging" or "uncoupling") of a force-fitting or form-fitting connection, in particular using a coupling device, and as a simple connecting or switching on (="engaging" or "coupling") and disconnecting or switching off (="disengaging" or "uncoupling"). An electric motor that is switched off and thus disengaged in the sense of this meaning may, for example, continue to be connected in a force-fitting or friction-locked manner to another element, e.g. to a transmission element such as a toothed belt, but without being able to transmit a force or a torque.

In some embodiments, the first motor and the second motor may be configured to drive a spindle drive. Furthermore, the first motor and the second motor may be configured as electric motors and/or servomotors. A configuration as a servomotor in particular enables a precise process monitoring and control in each case.

In some embodiments, the first motor and the second motor may be connected to the pressing member via a respective gear. A speed reduction of the rotational speed of the first motor and the second motor may in particular take place by the gear to generate the required pressing forces. This in particular also makes it possible to perform the pressing process by fast-rotating electric motors and nevertheless to apply the required torques. The gear associated with the second motor may in particular cause a greater speed reduction or slowing down of the rotational speed of the second motor than the gear associated with the first motor so that the force transmittable by the second motor may be increased with respect to the force transmittable by the first motor. For example, the gears may be configured as planetary gear sets.

In some embodiments, the product may be insertable transversely to the vertical through an entrance into the pressing chamber. The product may in particular be manually insertable into the pressing chamber. As already explained, the free space required for this purpose may be bridged in the vertical direction, in particular by the first motor that rotates quickly or transmits a fast rotation, before the pressing process may be performed by the second motor that transmits a comparatively large force.

The invention further relates to a pressing device for pressing meat products, in particular frozen and/or partly frozen meat products, preferably fresh meat products and/or bacon, comprising a pressing chamber which extends along a longitudinal direction and into which a product to be pressed may be inserted. The pressing chamber comprises a pressing member that may be moved by a drive in order to compress the product, wherein the product may be placed on a pressing plane in the pressing chamber. The drive further comprises a motor arranged beneath the pressing plane, wherein the motor is arranged in a closed housing.

Since the motor is arranged below the pressing plane, a contamination of the product in the pressing chamber, for example by a lubricant running or dripping down from the motor, may be reliably avoided. The arrangement of the motor in a closed housing again firstly makes it possible to avoid a contamination of the motor, for instance, by liquids exiting from the product during the pressing process.

Furthermore, the arrangement of the motor in a closed housing also makes it possible to protect the motor from any influences in a space in which the pressing device is arranged. In particular, the motor may thereby be prevented from being exposed to contamination by the room air that could possibly result in damage to the motor. Rather, in a precisely controllable closed housing, the motor may be protected against any impairments.

In some embodiments, an airflow device for generating an airflow may be arranged in the housing. The air flow device may in particular serve to distribute heat generated by the motor, which is arranged in the housing, in the housing so that the heat may be uniformly outwardly output via outer walls of the housing. An overheating of the motor may thereby be prevented.

In some embodiments, the airflow device may be configured to generate an annular flow. In this regard, the air flow device may be configured to generate an air flow that moves on a ring, i.e. on a closed, revolving flow path, within the housing and/or along walls of the housing. Such an annular flow may in particular distribute heat generated by the motor uniformly along the walls of the housing so that the heat may be uniformly outwardly output via these walls.

In some embodiments, the airflow device may comprise a fan that is configured to distribute heat generated by the drive in the housing by generating the air flow.

The motor may be configured as an electric motor in some embodiments. Such an electric motor may in particular be operated with comparatively small heat losses so that an overheating of the motor and/or the housing may be avoided despite the lack of air exchange.

Provision may be made that a fan is associated with a motor, e.g. because it has a spatial proximity to this motor. The fan may then e.g. be operated in dependence on specific measurement values, e.g. the motor temperature or other values (for example, the housing/air temperature of an adjacent housing section), to uniformly distribute the heat in the housing.

Due to the closed housing, an entry of moisture may furthermore be avoided in that no air exchange takes place.

The housing may be sealed in the direction of the pressing plane in some embodiments. The entry of product parts and/or liquids into the housing may in particular be prevented by such a sealing. Rather, parts detaching from the product during the pressing and/or exiting liquid may be e.g. be led off via a sheet metal or a surface above the housing in which the motor is arranged.

In some embodiments, the pressing chamber may comprise a first pressing member that is movable along the longitudinal direction in the direction of a first counter-element, a second pressing tool that is movable horizontally and transversely to the longitudinal direction in the direction of a second counter-element, and a third pressing member that is movable along the vertical in the direction of a third counter-element. The pressing device may further comprise a drive, which has at least one respective motor, for each of the pressing member, wherein the motors may be arranged below the pressing plane and in a closed housing.

Thus, the pressing device may in particular be configured to compress products in three dimensions. The longitudinal direction may further be oriented along a direction in which the pressing chamber has the greatest extent. Furthermore, the longitudinal direction may be horizontally oriented.

Since all the motors may be arranged beneath the pressing plane to move the pressing member, a contamination of the products in the pressing chamber, for example by exiting lubricant, may be prevented, as already explained. The arrangement of the motors in the closed housing conversely prevents a contamination of the motors. Heat generated by the motors may, as already explained, in particular due to the arrangement in the air flow device in the housing, be uniformly led off via the outer walls of the housing. Furthermore, the motors may be protected against moisture and/or corrosion by the arrangement in the closed housing.

As regards possible dimensions of the pressing device, in particular in accordance with the possible embodiments explained above and/or in accordance with the embodiment described in more detail below with reference to the Figures, the pressing device may have one or more of the following features, wherein these features, unless otherwise stated, may in particular be implemented in those embodiments of a pressing device that serve for pressing bacon:

The pressing device may be designed for maximum product dimensions with a product width of approximately 350 mm extending perpendicular to the longitudinal direction, a product length of approximately 800 mm extending in parallel with the longitudinal direction, and a product height of approximately 150 mm.

As regards the external dimensions of the pressing device, it may have a width of approximately 100 cm and a length of approximately 270 cm. A width of approximately 100 cm, which is comparatively narrow, may in particular be achieved by the kind of drive disclosed herein for the pressing member movable in the direction of the width and it may also be advantageous in another aspect, in particular an aesthetic aspect, namely in particular when other components of a processing line have at least approximately the same width. Known bacon slicers, for example, likewise have a width of approximately 100 cm so that the pressing device disclosed herein may optimally fit into a corresponding processing line. The pressing device may also be implemented with a width of up to approximately 130 cm to 140 cm to be able to compress wider products, such as may, for instance, be required for compressing bacon in the US market. A length of 270 cm is relatively small compared to known pressing devices having similar performances and for similar applications so that space may be saved in the longitudinal direction. The loading height, i.e. that height to which a user at least has to raise a product to be compressed in order to insert it into the pressing chamber of the pressing device, may be in the range from approximately 100 cm to 120 cm above the ground, in particular depending on the setting of vertically adjustable feet with which the pressing device stands on the ground. This relatively low loading height, which is ergonomically favorable and thus relieves the user, may also be achieved by the kind of drive disclosed herein for the pressing member movable in the direction of the width. This loading height may be defined by the upper side of a protective cover, in particular a pivotable and/or removable protective cover, for the pressing member movable in the direction of the width when the loading takes place over this protective cover.

The pressing member for compressing the products in the different directions may be adapted such that it may permanently withstand maximum loads as follows: compressing in the vertical direction: approximately 25 tons, i.e. approximately corresponds to a force of 250 kN; compressing in the longitudinal direction: approximately 4 tons, i.e. approximately corresponds to a force of 40 kN; compressing in the width direction, i.e. perpendicular to the longitudinal direction: approximately 8 tons, i.e. approximately corresponds to a force of 80 kN.

The invention furthermore relates to an independent aspect, namely the use of one motor or a plurality of motors, e.g. two motors, that serves/serve to move a pressing member of a pressing device, in particular a pressing device as disclosed herein, in order to check the operability of a transmission element, for example a toothed belt, via which the motor or motors moves/move the pressing member. The checking of the operability of the transmission element takes place in that it is stretched by the motor or the motors and a measurement value for the stretching is in this respect determined by evaluating signals of the motor or at least one of the motors and is compared with a reference value. In this respect, the motor or the motors is/are so-to-say used as a measurement device so that no additional measurement instruments are required to check the operability of the transmission element.

To be able to stretch the transmission element, the transmission element has to be acted on at two spaced-apart positions.

This may e.g. take place by two motors, of which either both act on the transmission element in opposite directions or of which one acts on the transmission element and the other merely firmly holds the transmission element and in this regard acts as a brake or an abutment.

Alternatively, the pressing device may have only a single motor, which is drive-effectively connected to the pressing member via the transmission element, in order to move the respective pressing member. To check the operability of the transmission element, a mechanical or electric braking or holding device is then additionally provided that may be moved between a passive position and an active position or may be switched between an ineffective state and an effective state and that engages into the drive train at any desired position to be able to firmly hold the transmission element directly or indirectly. The braking or holding device may e.g. engage at the transmission element, at the pressing member (e.g. simply as a mechanical abutment which may be moved into the travel path of the pressing member and which may be controlled by a control device) or at a drive, e.g. a linear drive, in particular a spindle drive, located in the drive train between the transmission element and the pressing member. If e.g. the transmission element is configured as a toothed belt, the braking or holding device may be a toothed wheel that normally runs along freely and that may be temporarily blocked by a control device for checking the operability of the toothed belt in order to firmly hold the toothed belt.

This concept is based on the idea that a transmission element that is, for example, damaged, e.g. partly torn, may be stretched further than an intact transmission element under otherwise identical conditions, i.e. it offers less resistance to the impact, wherein a torn transmission element offers practically no more resistance to the impact. These deviations from the normal, expected behavior of an intact transmission element may be recognized with the control concept in accordance with the invention.

If this check reveals that the transmission element is functional, there is a much lower risk that the transmission element will fail just when it is needed in a safety-relevant situation to hold the pressing member in a respective position. In such a situation, the motor or the respective active motor is namely switched off and it is assumed that a functional transmission element may hold the pressing member in its respective current position.

Depending on how much a respective measurement value deviates from a reference value, different measures may be taken. In the event of a relatively large deviation, an operation of the pressing device may, for example, be prevented by the control device until the control device receives confirmation from a user that the transmission element has been replaced. In the event of a relatively small deviation, based on which a speedy failure of the transmission element does not have to be assumed, a signal may, for example, be transmitted by the control device or another message may be generated by which it is signaled either to the user or to the manufacturer of the pressing device that a speedy replacement of the transmission element may become necessary, and the control device may, for example, request more frequent checks or may automatically perform them itself in order to ensure a more closely meshed checking of the transmission element.

As will be described in more detail with reference to an embodiment in connection with FIGS. 3A and 3B, this aspect of the invention is in particular advantageous when the pressing member is a vertically movable means and the pressing device comprises an entrance control device, such as a light grid, that serves as intervention protection for users and that serves to interrupt the current pressing process when an object located in the entrance of the press is detected. The interruption of the pressing process may take place by switching off the respective active motor or both motors for the vertical pressing member, wherein the pressing member, however, precisely only remains in its position when the transmission element is functional. If an already damaged transmission element, for example, tears precisely when a safe state is to be established by switching off the currently active motor, the safety of the pressing device is actually not given since the pressing element may not be held by the stopped motors and an intact transmission element.

This aspect of the invention may be combined with the other independent aspects of the present disclosure, i.e. the pressing devices disclosed herein may alternatively or additionally have this functionality defined in more detail in the corresponding embodiments and description passages. This also applies to the method relating to this aspect of the check of the operability of the transmission element.

In connection with this aspect of the invention, the invention relates, in accordance with the independent embodiment 35, to a pressing device that is inter alia characterized in that a control device is provided that is configured, in order to check the operability of the transmission element, to control and/or to regulate the first motor and the second motor such that the transmission element is acted on by the first motor and the second motor in the direction of a stretching of the transmission element, and the control device is further configured to compare a measurement value for the stretching, which is determined in this respect, i.e. during the action on the transmission element in the direction of a stretching, by evaluating signals of the first motor and/or the second motor, with a reference value for the stretching.

This concept is in particular possible with servomotors so that, in accordance with a possible embodiment, the first motor and the second motor are each configured as a servomotor. Servomotors allow the determination of the angular position of the motor shaft, i.e. a servomotor is provided with an encoder that determines the current position of the motor, for example, the angle of rotation of the motor shaft that has been covered with respect to an initial position. For example, in a position regulation or location regulation of a servomotor, the regulation associated with the servomotor repeatedly compares the signal of the encoder with a predefined desired position value. On a deviation from the desired value, the motor shaft is rotated in the corresponding direction until the desired position of the motor shaft that is desired in each case is reached.

Due to a suitable cooperation of the two motors, which is possible in a variety of ways, a reference value for the stretching may consequently be determined by a functional transmission element by operating the motors in the sense of a stretching of the transmission element. During the operation of the pressing device, either outside or during an actual pressing process, a stretching may then take place again by the two motors under the same conditions in each case, wherein a deviation of the measurement value determined in this respect for the stretching from the previously determined reference value may be assessed to the effect that the transmission element is not functional, i.e. is damaged or even torn, for example.

The transmission element is preferably an endless element that revolves around the two motors and around the pressing member, in particular around one or more drives, e.g. spindle drives, for the pressing member. Consequently, two sections of the endless transmission element are located between the two motors so that—if each of the two sections has a sufficient length, i.e. the two motors are not disposed too close to one another with respect to the course of the transmission element—both sections of the transmission element may be considered for being stretched in each case by a corresponding drive sense of the motors for the purpose of checking the operability of the transmission element.

In some embodiments, provision may be made that the first motor and the second motor are connected to the pressing member via a respective gear, wherein the gear ratios for the two motors, which are preferably identical in design and/or have the same performance features, are selected differently such that the first motor may move the pressing member faster relative to the second motor and the second motor may develop a greater force relative to the first motor, in particular wherein the second motor may be engaged for compressing the product.

The pressing member may be connected to the transmission element via at least two linear drives, in particular three or four linear drives, for example spindle drives, wherein the linear drives are connected to the pressing member and the pressing member may be moved in a synchronized manner by the linear drives by the transmission element.

The invention also relates to a method of checking the operability of a transmission element in a pressing device, in particular a pressing device as disclosed herein. The method comprises the steps that the transmission element is acted on by the first motor and the second motor in the direction of a stretching of the transmission element; that signals of the first motor and/or of the second motor are evaluated in this respect; that a measurement value for the stretching of the transmission element is determined from the evaluated signals; that the determined measurement value is compared with a reference value for the stretching of the transmission element; and that, in the event of a predefined or predefinable deviation of the measurement value from the reference value, a non-functional transmission element, in particular a damaged or torn transmission element, is inferred.

As already mentioned above, the action on the transmission element in the direction of a stretching of the transmission element may take place in different ways. For example, the two motors may be set into mutually opposite drive movements. Alternatively, the one motor may be set into a drive movement and the other motor may be held in a non-drive-effective manner so that it is in engagement with the transmission element, but does not move the transmission element in a drive-effective manner. The other motor may in particular be operated in a position regulation or location regulation that is intended to keep the position or location of the motor shaft unchanged. Alternatively, the one motor may be set into a drive movement and the other motor may in this respect only be taken along via the transmission element, i.e. the other motor is in particular only connected in a form-fitting or friction-locked manner to the transmission element, but does not itself actively drive the transmission element. The other motor, which is passive in this regard, is thus taken along via the transmission element when the active motor is set into the drive movement. In a functional transmission element, a certain position change is expected in the other motor in the event of such a taking along of the other motor. If this fails to occur, i.e. if the motor taken along moves less than expected or does not move at all anymore, a non-functional transmission element may thus be inferred.

The checking of the transmission element, i.e. the action on the transmission element in the direction of a stretching, may either take place outside a pressing process performed by the pressing member or during such a pressing process.

The two motors may, in particular due to different gear ratios, form a relatively "strong" motor, on the one hand, and a relatively "fast" motor, on the other hand. In this respect, provision may be made that the strong motor is only engaged or coupled during a pressing process, i.e. drive-effectively connected to the pressing member, and the fast motor is only taken along during the pressing process, whereas for a fast pre-positioning of the pressing member or for a fast movement of the pressing member for opening or closing, the strong motor is disengaged so that the fast motor may move the pressing member quickly. If the transmission element is to be checked during the pressing process, this may consequently take place in accordance with the concept last explained above, i.e. in that the strong motor drives the pressing member by the transmission element and the fast motor is only taken along.

In accordance with that variant of this aspect of the invention according to which two motors are not necessarily used, but rather one motor and one braking or holding device, as explained above, the invention furthermore relates to a pressing device having the features of the independent embodiment 39 and a method having the features of the independent embodiment 43. The further developments of the other variant ("two motors") mentioned within the framework of the present disclosure, e.g. with regard to possible embodiments of the motor, of the transmission element, and of a drive for the pressing member, are hereby also disclosed as further developments of this variant insofar as they do not refer to the mandatory presence of two motors.

Furthermore, in connection with this aspect of the invention, the invention relates to a method of pressing meat products that has the features of the independent embodiment 44 and that is inter alia characterized by one of the above-explained methods in accordance with the invention of checking the operability of the transmission element.

In summary, in accordance with the last-named aspects, the invention may thus be implemented in the following embodiments:

1. A pressing device (11) for pressing meat products, in particular frozen and/or partly frozen meat products, preferably fresh meat products and/or bacon,
    comprising a pressing chamber (13) which extends along a longitudinal direction (L) and into which a product to be pressed may be inserted through an entrance (19) along an insertion direction (B); and an entrance control device (21) that is configured to detect an object located in the entrance (19) and to transmit a corresponding detection signal (S).

2. A pressing device (11) in accordance with embodiment 1,
    wherein the entrance control device (21) comprises a light barrier (23) and is configured to transmit the detection signal (S) on an interruption of the light barrier (23).

3. A pressing device (11) in accordance with embodiment 1 or 2,
    wherein the entrance control device (21) is configured to generate a light grid (25) along the entrance (19) and to transmit the detection signal (S) on an interruption of the light grid (25).

4. A pressing device (11) in accordance with any one of the preceding embodiments,
    wherein the entrance control device (21) comprises a plurality of light sources (35) that are configured to transmit a respective light beam from a first side (37) of the entrance (19) transversely to the insertion direction (B) to a second side (39) of the entrance (19), wherein, at the second side (39) of the entrance (19), the entrance control device (21) has an associated light sensor (41) for each of the plurality of light sources (35), said associated light sensor (41) being configured to detect the light beam transmitted by the associated light source (35), wherein the entrance control device (21) is configured to transmit the detection signal (S) when at least one of the light sensors (41) does not detect a light beam.

5. A pressing device (11) in accordance with embodiment 4,
    wherein the light sources (35) are arranged behind one another, in particular vertically behind one another, at the first side (37) and the light sensors (41) are arranged behind one another, in particular vertically behind one another, at the second side (39).

6. A pressing device (11) in accordance with embodiment 4 or 5,
    wherein the light sources (35) and the light sensors (41) are arranged in a respective tube (43) or rod, in particular wherein the tube (43) or the rod is made from a material transparent for the wavelength of the respective light used, preferably from a plastic, from Plexiglas, from a metal, or from a ceramic material.

7. A pressing device (11) in accordance with any one of the embodiments 4 to 6,
    wherein the pressing device (11) comprises a front frame (45), in particular a sheet metal frame, by which the light sources (35) and/or the light sensors (41) are shielded at a front side (46) facing away from the pressing chamber (13).

8. A pressing device (11) in accordance with any one of the embodiments 4 to 7,
    wherein the pressing device (11) comprises a rear frame (47), in particular a sheet metal frame, by which the light sources (35) and/or the light sensors (41) are shielded at a rear side (48) facing the pressing chamber (13).

9. A pressing device (11) in accordance with any one of the embodiments 4 to 8,
    wherein the light sources (35) and/or the light sensors (41) are encapsulated at three sides, in particular in a U shape.

10. A pressing device (11) in accordance with any one of the preceding embodiments,
    wherein the pressing device (11) has a state display device (51) that is configured to indicate a readiness state of the pressing device (11) for performing a pressing process when the entrance control device (21) does not transmit a detection signal (S).

11. A pressing device (11) in accordance with any one of the preceding embodiments,
    wherein the pressing chamber (13) comprises at least one counter-element (15, 31, 33) and a pressing member (17, 27, 29) that may be moved in the direction of the counter-element (15, 31, 33) in order to compress the product.

12. A pressing device (11) in accordance with embodiment 11,
    wherein the product may be inserted over the pressing member (27) into the pressing chamber (13).

13. A pressing device (11) in accordance with any one of the preceding embodiments,
    wherein the product may be manually inserted into the pressing chamber (13).

14. A pressing device (11) in accordance with any one of the preceding embodiments,
wherein the pressing chamber (13) is accessible through the entrance (19) during the pressing.

15. A pressing device (11) in accordance with any one of the preceding embodiments,
wherein the insertion direction (B) is oriented transversely to the longitudinal direction (L).

16. A pressing device (11) in accordance with any one of the preceding embodiments,
wherein the entrance control device (21) is connected to a control device (53), wherein the control device (53) is configured to receive the detection signal (S) and to control a pressing process of the pressing device (11).

17. A pressing device (11) in accordance with embodiment 16,
wherein the entrance control device (21) is configured to transmit a release signal (F) when no object is located in the entrance (19), wherein the control device (53) is configured to start the pressing process with a predefined or predefinable time correlation between a detection signal (S) and a subsequent release signal (F).

18. A pressing device (11) in accordance with embodiment 16 or 17,
wherein the control device (53) is configured to slow down the pressing process in response to the detection signal (S).

19. A pressing device (11) in accordance with any one of the embodiments 16 to 18,
wherein the control device (53) is configured to stop the pressing process in response to the detection signal (S).

20. A method of pressing meat products, in particular frozen and/or partly frozen meat products, preferably fresh meat products and/or bacon, in particular by a pressing device (11) in accordance with any one of the preceding embodiments,
wherein a product is inserted through an entrance (19) into a pressing chamber (13) of the pressing device (11),
wherein the pressing process is started in response to a detection signal (S) of an entrance control device (21), which is configured to detect an object located in the entrance (19), and a subsequent release signal (F) of the entrance control device (21) that indicates that no object is located in the entrance (19) and/or
wherein an already started pressing process is slowed down in response to the detection signal (S).

21. A method in accordance with embodiment 20,
wherein the already started pressing process is stopped in response to the detection signal (S).

22. A pressing device (11) for pressing meat products, in particular frozen and/or partly frozen meat products, preferably fresh meat products and/or bacon, comprising a pressing chamber (13) which extends along a longitudinal direction (L) and into which a product to be pressed may be inserted, in particular in accordance with any one of the embodiments 1 to 19,
wherein the pressing chamber (13) comprises a pressing member (29) that may be vertically moved in order to compress the product,
wherein the pressing device (11) further comprises a first motor (57) and a second motor (59) that are configured to move the pressing member (29).

23. A pressing device (11) in accordance with embodiment 22,
wherein the first motor (57) is configured to move the pressing member (29) faster relative to the second motor (59), wherein the second motor (59) is configured to develop a greater force relative to the first motor (57).

24. A pressing device (11) in accordance with embodiment 22 or 23,
wherein the pressing device (11) has a control device (53) that is configured, in order to press the product inserted into the pressing chamber (13), to first pre-position the pressing member (29) by controlling the first motor (57) and to then compress the pressing member (29) by controlling the second motor (59).

25. A pressing device (11) in accordance with any one of the embodiments 22 to 24,
wherein the second motor (59) may be engaged for compressing the product.

26. A pressing device (11) in accordance with any one of the embodiments 22 to 25,
wherein the first motor (57) and the second motor (59) are connected to the pressing member (29) via a respective gear (61).

27. A pressing device (11) in accordance with any one of the embodiments 22 to 26,
wherein the product may be inserted transversely to the vertical through an entrance (19) into the pressing chamber (13), in particular manually.

28. A pressing device (11) for pressing meat products, in particular frozen and/or partly frozen meat products, preferably fresh meat products and/or bacon, comprising a pressing chamber (13) which extends along a longitudinal direction (L) and into which a product to be pressed may be inserted, in particular in accordance with any one of the embodiments 1 to 19 and/or in accordance with any one of the embodiments 22 to 27,
wherein the pressing chamber (13) comprises a pressing member (17, 27, 29) that may be moved by a drive in order to compress the product,
wherein the product may be placed on a pressing plane (63) in the pressing chamber (13), wherein the drive comprises a motor (57, 59, 75, 115) arranged beneath the pressing plane (63), and wherein the motor (57, 59, 75, 115) is arranged in a closed housing (55).

29. A pressing device (11) in accordance with embodiment 28,
wherein an air flow device (65) for generating an air flow is arranged in the housing (55).

30. A pressing device (11) in accordance with embodiment 29,
wherein the air flow device (65) is configured to generate an annular flow.

31. A pressing device (11) in accordance with embodiment 29 or 30,
wherein the air flow device (65) comprises a fan (67) that is configured to distribute heat generated by the drive in the housing (55) by generating the air flow.

32. A pressing device (11) in accordance with any one of the embodiments 28 to 31,
wherein the motor (57, 59, 75, 115) is configured as an electric motor, in particular as a servomotor.

33. A pressing device (11) in accordance with any one of the embodiments 28 to 32,
wherein the housing (55) is sealed in the direction of the pressing plane (63).

34. A pressing device (11) in accordance with any one of the embodiments 28 to 33,
wherein the pressing chamber (13) comprises a first pressing member (17) that is movable along the longitudinal direction (L) in the direction of a first counter-element (15), a second pressing member (27) that is movable horizontally and transversely to the longitudinal direction (L) in the direction of a second counter-element (31), and a third pressing member (29) that is movable along the vertical in the direction of a third counter-element (33),
wherein the pressing device (11) comprises a drive, which has at least one respective motor (57, 59, 75, 115), for each of the pressing member (17, 27, 29), and wherein the motors (57, 59, 75, 115) are arranged below the pressing plane (63) and in the closed housing (55).

35. A pressing device (11) for pressing meat products, in particular frozen and/or partly frozen meat products, preferably fresh meat products and/or bacon, comprising a pressing chamber (13) into which a product to be pressed may be inserted, in particular in accordance with any one of the embodiments 1 to 19 and/or in accordance with any one of the embodiments 22 to 27 and/or in accordance with any one of the embodiments 28 to 34,
wherein the pressing chamber (13) comprises at least one pressing member (29) that may be moved, in particular vertically moved, to compress the product,
wherein the pressing device (11) further comprises a first motor (57) and a second motor (59) that are both drive-effectively connected to the pressing member (29) via at least one common elongated transmission element (117), in particular via a belt, preferably a toothed belt, or via a chain, and that are configured to move the pressing member (29) by the transmission element (117), and
wherein a control device (53) is provided that is configured, in order to check the operability of the transmission element (117), to control and/or to regulate the first motor (57) and the second motor (59) such that the transmission element (117) is acted on by the first motor (57) and the second motor (59) in the direction of a stretching of the transmission element (117), and to compare a measurement value for the stretching, which is determined by evaluating signals of the first motor (57) and/or the second motor (59) thereby, with a reference value for the stretching.

36. A pressing device (11) in accordance with embodiment 35,
wherein the first motor (57) and the second motor (59) are each configured as a servomotor.

37. A pressing device (11) in accordance with embodiment 35 or 36,
wherein the first motor (57) and the second motor (59) are connected to the pressing member (29) via a respective gear (61), and wherein the gear ratios for the two motors (57, 59), which are preferably identical in design and/or have the same performance features, are selected differently such that the first motor (57) may move the pressing member (29) faster relative to the second motor (59) and the second motor (59) may develop a greater force relative to the first motor (57), in particular wherein the second motor (59) may be engaged for compressing the product.

38. A pressing device (11) in accordance with any one of the embodiments 35 to 37,
wherein the pressing member (29) is connected to the transmission element (117) via at least two linear drives, in particular three or four linear drives, in particular spindle drives (118), which are connected to the pressing member (29) and by which the pressing member (29) may be moved synchronized by the transmission element (117).

39. A pressing device (11) for pressing meat products, in particular frozen and/or partly frozen meat products, preferably fresh meat products and/or bacon, comprising a pressing chamber (13) into which a product to be pressed may be inserted, in particular in accordance with any one of the embodiments 1 to 19 and/or in accordance with any one of the embodiments 22 to 27 and/or in accordance with any one of the embodiments 28 to 34,
wherein the pressing chamber (13) comprises at least one pressing member (29) that may be moved, in particular vertically moved, to compress the product,
wherein the pressing device (11) comprises at least one motor (57, 59), in particular a servomotor, and a braking or holding device, wherein the motor (57, 59) is drive-effectively connected to the pressing member (29) via at least one elongated transmission element (117), in particular via a belt, preferably a toothed belt, or via a chain, and is configured to move the pressing member (29) by the transmission element (117),
wherein the braking or holding device may be moved between a passive position and an active position and/or may be switched between an ineffective state and an effective state and is configured to engage into the drive train at a position, in particular at the transmission element, at the pressing member, or at a drive located in the drive train between the transmission element and the pressing member, in order to firmly hold the transmission element directly or indirectly in the active position or in the effective state, and
wherein a control device (53) is provided that is configured, in order to check the operability of the transmission element (117), to control and/or to regulate the motor (57, 59) and the braking or holding device such that the transmission element (117) firmly held by the braking or holding device is acted on by the motor (57) in the direction of a stretching of the transmission element (117), and to compare a measurement value for the stretching, which is determined by evaluating signals of the motor (57) thereby, with a reference value for the stretching.

40. A method of checking the operability of a transmission element (117) in a pressing device (11) for pressing meat products, in particular frozen and/or partly frozen meat products, preferably fresh meat products and/or bacon, in particular in a pressing device (11) in accordance with any one of the embodiments 1 to 19 and/or in accordance with any one of the embodiments 22 to 39,
wherein the pressing device (11) comprises a pressing chamber (13) into which a product to be pressed may be inserted and which comprises at least one pressing member (29) that may be moved, in particular vertically moved, to compress the product, wherein the pressing device (11) further comprises a first motor (57) and a second motor (59) that are both drive-effectively connected to the pressing member (29) via at least one common elongated transmission element (117), in particular via a belt, preferably a toothed belt, or via a chain, and that are configured to move the pressing member (29) by the transmission element (117), wherein the method comprises that the transmission element (117) is acted on by the first motor (57) and the second motor (59) in the direction of a stretching of the transmission element (117), that signals of the first motor (57) and/or of the second motor (59) are evaluated thereby, that a measurement value for the stretching of the transmission element (117) is determined from the evaluated signals, that the determined measurement value is compared with a reference value for the stretching of the transmission element (117), and that, in the event of a predefined or predefinable deviation of the measurement value from the reference value, a non-functional transmission element (117), in particular a damaged or torn transmission element, is inferred.

41. A method in accordance with embodiment 40, wherein the action on the transmission element (117) in the direction of a stretching of the transmission element (117) takes place in that the two motors (57, 59) are set into mutually opposite drive movements, or in that the one motor (57) is set into a drive movement and the other motor (59) is held in a non-drive-effective manner, in particular is operated in a position regulation, or in that the one motor (57) is set into a drive movement and the other motor (59) is taken along via the transmission element (117).

42. A method in accordance with embodiment 40 or 41, wherein the action on the transmission element (117) in the direction of a stretching of the transmission element (117) takes place outside a pressing process performed by the pressing member (29), in particular when the second motor (59) is not engaged, or wherein the action on the transmission element (117) in the direction of a stretching of the transmission element (117) takes place during a pressing process performed by the pressing member (29), in particular when the second motor (59) is engaged.

43. A method of checking the operability of a transmission element (117) in a pressing device (11) for pressing meat products, in particular frozen and/or partly frozen meat products, preferably fresh meat products and/or bacon, in particular in a pressing device (11) in accordance with any one of the embodiments 1 to 19 and/or in accordance with any one of the embodiments 22 to 39, wherein the pressing device (11) comprises a pressing chamber (13) into which a product to be pressed may be inserted and which comprises at least one pressing member (29) that may be moved, in particular vertically moved, to compress the product, and wherein the pressing device (11) comprises at least one motor (57, 59), in particular a servomotor, and a braking or holding device, wherein the motor (57, 59) is drive-effectively connected to the pressing member (29) via at least one elongated transmission element (117), in particular via a belt, preferably a toothed belt, or via a chain, and is configured to move the pressing member (29) by the transmission element (117), and wherein the braking or holding device may be moved between a passive position and an active position and/or may be switched between an ineffective state and an effective state and is configured to engage into the drive train at a position, in particular to engage at the transmission element, at the pressing member, or at a drive located in the drive train between the transmission element and the pressing member, in order to firmly hold the transmission element directly or indirectly in the active position or in the effective state, wherein the method comprises that the transmission element (117) is acted on by the motor (57) in the direction of a stretching of the transmission element (117) and thereby firmly held directly or indirectly by the braking or holding device, that signals of the second motor are evaluated thereby, that a measurement value for the stretching of the transmission element (117) is determined from the evaluated signals, that the determined measurement value is compared with a reference value for the stretching of the transmission element (117), and that, in the event of a predefined or predefinable deviation of the measurement value from the reference value, a non-functional transmission element (117), in particular a damaged or torn transmission element, is inferred.

44. A method of pressing meat products, in particular frozen and/or partly frozen meat products, preferably fresh meat products and/or bacon, by a pressing device (11), in particular by a pressing device (11) in accordance with any one of the embodiments 1 to 19 and/or in accordance with any one of the embodiments 22 to 39, wherein the pressing device (11) comprises a pressing chamber (13) into which a product to be pressed may be inserted and which comprises at least one pressing member (29) that may be moved, in particular vertically moved, in order to compress the product, wherein the pressing device (11) further comprises a first motor (57) and a second motor (59) that are both drive-effectively connected to the pressing member (29) via at least one common elongated transmission element (117), in particular via a belt, preferably a toothed belt, or via a chain, and that are configured to move the pressing member (29) by the transmission element (117), wherein the pressing device (11) comprises at least one motor (57, 59), in particular a servomotor, and a braking or holding device, wherein the motor (57, 59) is drive-effectively connected to the pressing member (29) via at least one elongated transmission element (117), in particular via a belt, preferably a toothed belt, or via a chain, and is configured to move the pressing member (29) by the transmission element (117), and wherein the braking or holding device may be moved between a passive position and an active position and/or may be switched between an ineffective state and an effective state and is configured to engage into the drive train at a position, in particular to engage at the transmission element, at the pressing member, or at a drive located in the drive train between the transmission element and the pressing member, in order to firmly hold the transmission element directly or indirectly in the active position or in the effective state, and wherein the operability of the transmission element (117) is checked by a method in accordance with any one of the embodiments 40 to 43.

The invention will be explained in the following purely by way of example with reference to an embodiment and to the drawings.

Figure 3A:
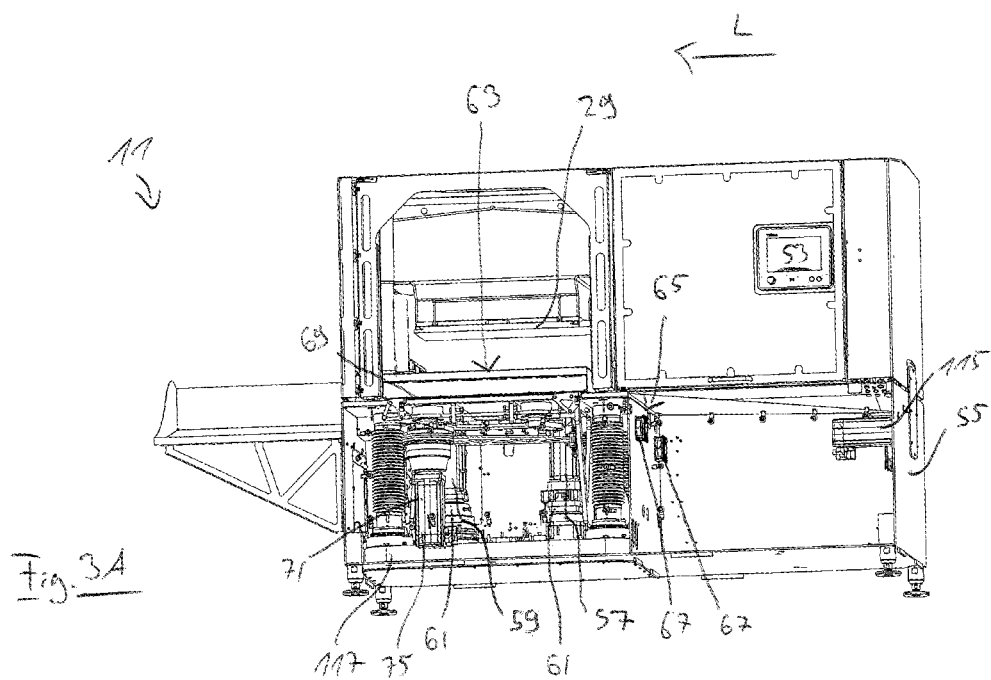
Figure 3B:
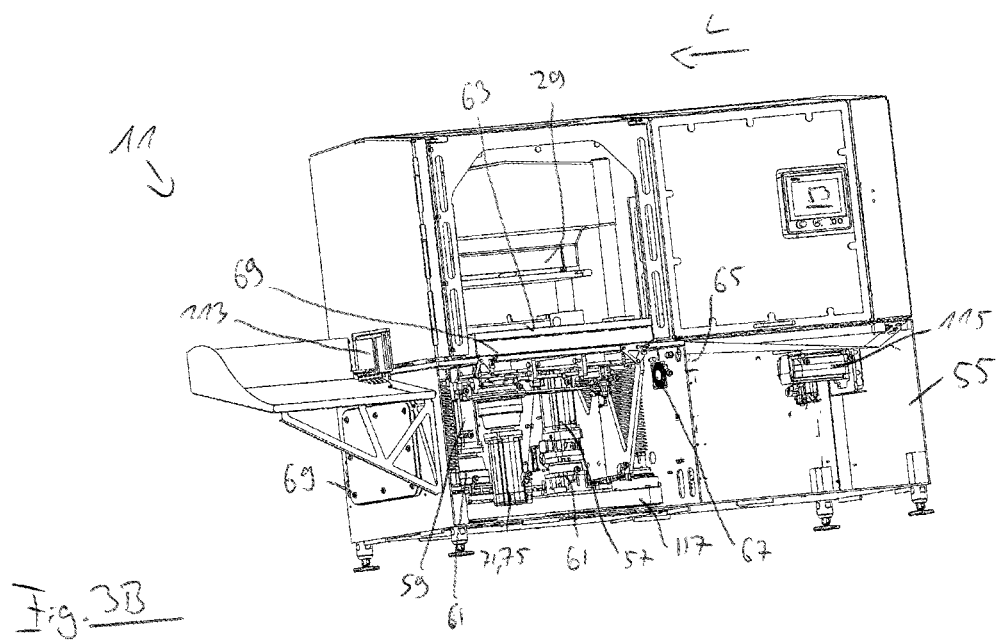
Figure 6B:
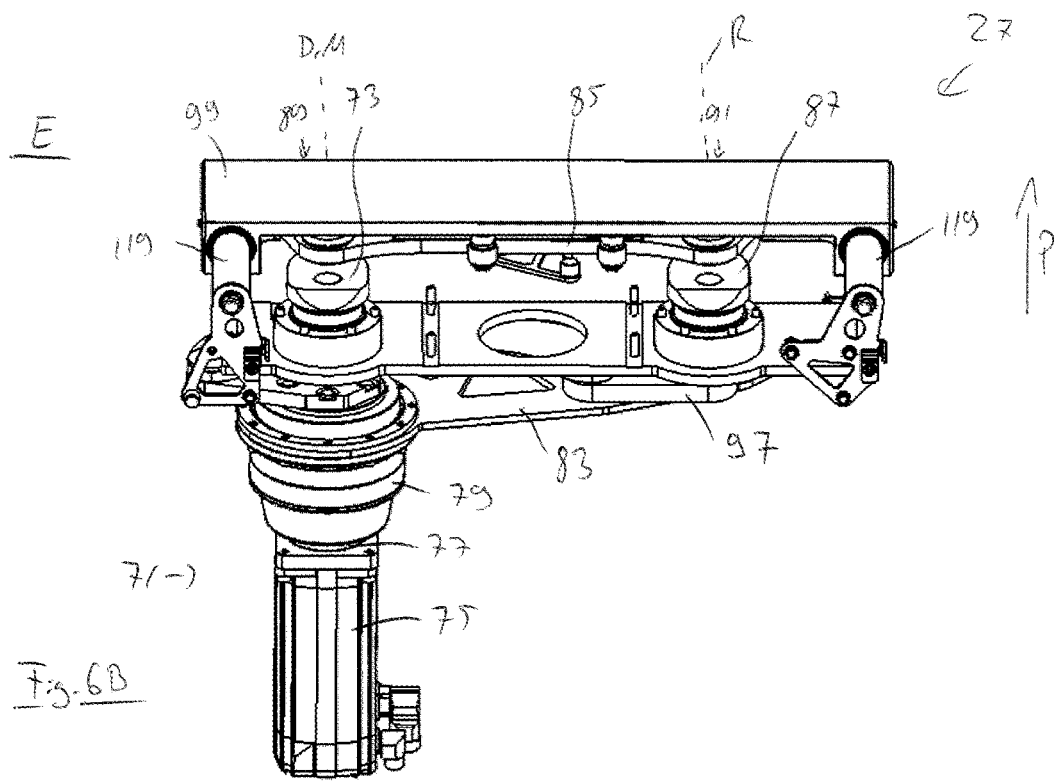
Figure 74:
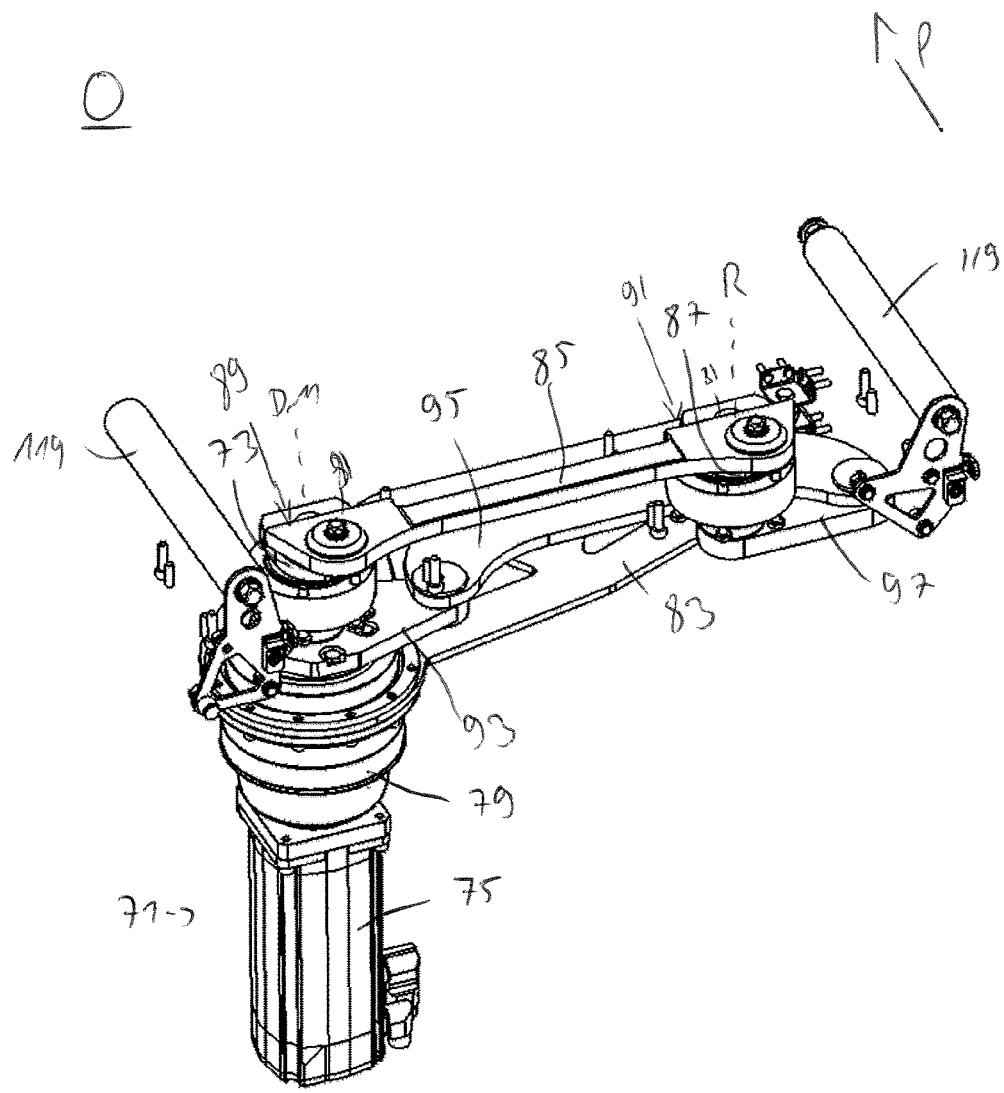
Figure 8B:
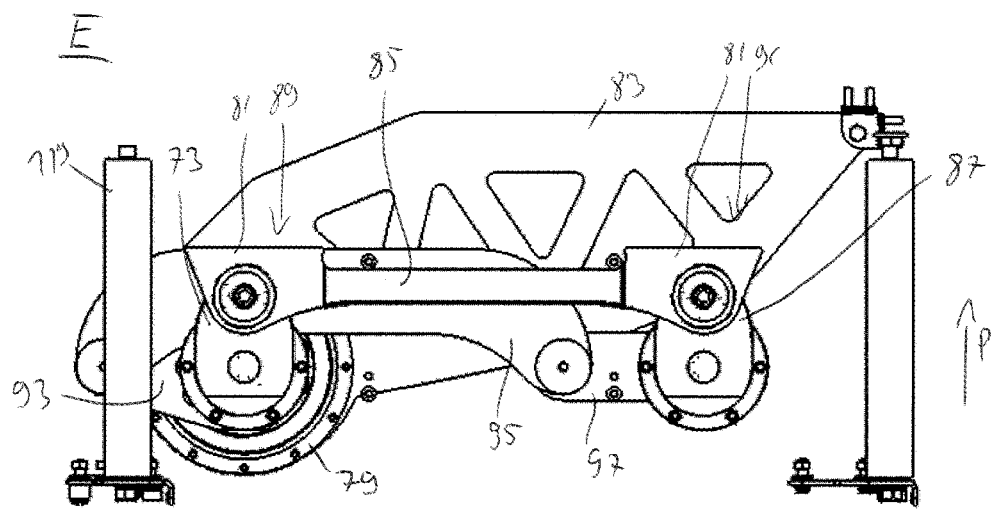

There are shown:

FIGS. 1A to 1D a respective perspective view of a pressing device for pressing meat products, wherein some components of the pressing device are removed in FIGS. 1C and 1D;

FIGS. 2A to 2C a perspective rear view and a perspective front view of an entrance to a pressing chamber of the pressing device and a detailed top view for illustrating an encapsulation of components of an entrance control device;

FIGS. 3A and 3B a respective schematic representation of the pressing device with an open housing;

FIGS. 4A and 4B a perspective representation of a pressing member which is movable in a pressing direction and for which a protective cover is provided, with the protective cover closed and with the protective cover open;

FIGS. 5A to 5C a side view of the pressing member and two detailed views of the protective cover for illustrating the possibility of a tool-free removal of the protective cover;

FIGS. 6A and 6B a respective perspective view of the pressing member in a starting position, in which a product may be inserted into the pressing chamber of the pressing device, and an end position in which the product inserted into the pressing chamber is compressed;

FIGS. 7A and 7B a respective schematic representation of a drive of the pressing member with a positioning in the starting position and a positioning in the end position; and FIGS. 8A and 8B a plan view of the drive in the starting position of the pressing member and in the end position of the pressing member.

FIGS. 1A to 1D show a pressing device 11 for pressing meat products, wherein the pressing device 11 may in particular be provided for pressing frozen and/or partly frozen meat products, for example fresh meat products and/or bacon. The pressing device 11 has a pressing chamber 13 which extends along a longitudinal direction L and into which products to be pressed may be inserted through an entrance 19 along an insertion direction B. In the pressing device 11 illustrated here, a manual loading or a manual insertion of products into the pressing chamber 13 is provided so that a user may reach through the entrance 19 and may place the product on a pressing plane 63 in the pressing chamber 13.

The pressing chamber 13 comprises a first pressing member 17 that is configured to be moved along the longitudinal direction L towards a first counter-element 15 in order thereby to compress a product in the longitudinal direction that is inserted into the pressing chamber 13. The pressing chamber 13 further comprises a second pressing member 27 that is configured to be moved transversely to the longitudinal direction L and in the horizontal towards a second counter-element 31 to also be able to compress a product in this direction. Furthermore, the pressing chamber 13 comprises a third pressing member 29 that is vertically downwardly movable to be able to compress a product against a third counter-element 33 that forms the product plane 63. The longitudinal direction L may in particular extend in the horizontal and the pressing plane 63 may also be oriented horizontally. A product may thus be compressed in the three spatial directions by the pressing device 11. This may, for example, make it possible to bring irregularly shaped bacon into an approximately parallelepiped shape to be able to package and offer the bacon for sale in this manner or to be able to process the bacon further, wherein the bacon may, for example, be cut into slices by a slicing apparatus arranged downstream. A completely compressed product may be pushed out of the pressing chamber 13 through an output 113 in the longitudinal direction L, for example, by the first pressing member 17.

As may in particular be seen from FIGS. 1B and 1D, the second pressing member 27, which is displaceable transversely to the longitudinal direction L, comprises a movable carriage 99 to which a pressing tool 101 is connected. An RFID chip 109, in which a marking 107 is stored based on which the pressing tool 101 may be identified, is installed at the pressing tool 101 in this respect. To enable an identification of the pressing tool 101, a control device 53 of the pressing device 11 comprises a readout device 111 by which the marking 107 may be read out.

Provision is further made in the pressing device 11 that the pressing tool 101 may be removed from the pressing chamber 13 without tools and/or may be inserted into the pressing chamber 13 without tools. In particular, the pressing tool 101 may be releasable from the carriage 99 without tools and/or may be connectable to the carriage 99 without tools for this purpose. For example, provision may be made that the tool 101 may be connected to the carriage 99 via a plug-in connection.

Such a tool-free removal of the pressing tool 101 may in particular make it possible to quickly remove the pressing tool 101 from the pressing chamber 13 for a cleaning or maintenance. Furthermore, due to such a tool-free removal, in which in particular the mostly heavy carriage 99 may remain in the pressing chamber, different pressing tools 101 may, however, be flexibly connected to the carriage 99 in order to, for example, be able to achieve a greater compression by inserting a larger pressing tool 101. Since the readout device 111 may in this respect be configured to read out a respective RFID chip 109 of the pressing tool 101, the pressing process may in particular be performed while considering the respective pressing tool 101 used. Thus, different travel distances and/or pressing forces may, for example, be associated with a respective pressing tool 101 and the control device 53 may be configured to perform a corresponding process control.

Furthermore, it can be seen from FIGS. 1A to 1D that a product to be inserted into the pressing chamber 13 is to be inserted over the second pressing member 27 along the insertion direction B into the pressing chamber 13. As already explained, this may in particular take place manually in this pressing device 11. Therefore, a user has to reach into the pressing chamber 13 to insert a product. To be able to reliably prevent any injuries to a user, even though the user has to be able to reach into the pressing chamber 13 during the operation, the pressing device 11 has an entrance control device 21 that is configured to detect an object located in the entrance 19 and to transmit a corresponding detection signal S to the control device 53. As can in particular be seen from FIGS. 2A and 2B, the entrance control device 21 in particular has a plurality of light sources 35 for this purpose that are arranged at a first side 37 of the entrance 19, that are arranged behind one another in a row, and that are configured to transmit a respective light beam. At a second side 39 of the entrance 19 opposite the first side 37 of the entrance 19, associated light sensors 41 are arranged for each of the light sources and are configured to detect the respective light beam emitted by the associated light source 35. Accordingly, a respective light source 35 and the associated light sensor 39 form a light barrier 22. The light sensors 41 are also arranged behind one another in a row.

Since the entrance control device 21 has a plurality of light sources 35 and a plurality of corresponding light sensors 41, the entrance control device 21 is configured to generate a light grid 25 along the entrance 19. This light grid 25 in particular comprises the light beams which are aligned in parallel with one another and which the light sources 35 transmit. The entrance control device 21 may in particular be configured to transmit the detection signal S to the control device 53 when at least one of the light barriers 23 or the light grid 25 is interrupted.

Since such an entrance control device 21 is provided, an unauthorized intervention of a user through the entrance 19 may in particular be detected and a pressing process that may have already started may be influenced to prevent an injury of the user. This enables a high degree of safety of the pressing device 11, whereas it is, however, not necessary to close the entrance 19 by a solid cover before a pressing process. This is usually necessary in conventional pressing devices, which, however, due to the weight of such a cover, is usually difficult to perform and may in particular also slow down the process of pressing since such a closing of the pressing chamber 13 is necessary before each pressing process and the entrance 19 first has to be opened again to be able to insert a new product into the pressing chamber 13. In the pressing device 11 illustrated by the Figures, the entrance 19 may, in contrast, remain open during the entire pressing process, wherein, however, a high process safety may nevertheless be achieved due to the entrance control device 21.

Furthermore, the process control may be improved even further by directly incorporating signals transmitted by the entrance control device 21, in particular the detection signal S, into the process control. The entrance control device 21 may furthermore be configured to transmit a release signal F when no object is located in the entrance 19. For this purpose, the entrance control device 21 may, for example, transmit a separate signal in order to transmit a release signal F to the control device 53, or the absence of a detection signal S may be assessed as a release signal F. The control device 53 may, for example, be configured to automatically start the pressing process when a predefined or predefinable time correlation between a detection signal S and a subsequent release signal F is present. When a user inserts a product to be pressed into the pressing chamber 13, the user reaches through the entrance 19 and, due to the arm of the user being located in the entrance 19, the entrance control device 21 generates a detection signal S. However, as soon as the user removes the arm from the entrance 19 again, the entrance control device 21 may transmit a release signal F. If there is a time correlation between the firstly transmitted detection signal S and the subsequent release signal F that may, for instance, reflect the duration of a typical insertion process, the control device 53 may automatically start the pressing process. Further actions of the user for starting the pressing process are therefore not required so that it may be performed in an accelerated manner overall. Due to the time correlation, it may also be ensured that, for example, a pressing process is not started immediately in the case of a release signal F that follows a detection signal S so that, for example, no pressing process is started after longer-lasting maintenance work during which an object is permanently located in the entrance 19. However, provision may also be made to prevent an automatic start of a pressing process during maintenance work by the control device 53.

As mentioned in the introductory part, the pressing device 11 is provided with a state display device 51 that, e.g. by lighting up a green lamp, indicates a readiness state of the pressing device 11 for performing a pressing process when the entrance control device 21 does not transmit a detection signal S and that indicates a warning signal, e.g. by lighting up a red lamp, when a detection signal S is present.

As can further be seen from FIGS. 2A to 2C, the light sources 35 and the light sensors 41 are arranged in a respective tube 43, such as may in particular be made from plastic and/or of Plexiglas. The tubes 43 may furthermore be sealed in order in particular to protect the light sources 35 or the light sensors 41 against the entry of liquid used for cleaning purposes and against damage caused thereby.

Furthermore, the pressing device 11 has a front frame 45 by which the light sources 35 and the light sensors 41 are shielded at a front side 46 facing away from the pressing chamber 13. The front frame 45 may, for example, be formed from sheet metal and may serve to additionally protect the light sources 35 or the light sensors 41 against damage when the pressing chamber 13 is, for example, cleaned by a high-pressure cleaner. At the same time, such a cleaning of the pressing chamber 13 may thereby be made possible without damage to the entrance control device 21 being imminent.

Furthermore, the pressing device 11 has a rear frame 47, which may so-to-say be formed from sheet metal, at a rear side 48 facing the pressing chamber 13. This rear frame 47 may in particular protect the light sources 35 or the light sensors 41 against damage when, for example, the pressing tool 101 of the second pressing member 27 is removed from the pressing chamber 13. An abutment of the pressing member 101 at the tubes 43 may be avoided. Similarly, the front frame 45 may also serve to prevent an abutment of the pressing tool 101 at the tubes 43 and/or at the light sources 35 and/or at the light sensors 41 during an insertion of the pressing tool 101.

As can in particular be seen from FIG. 2C, the light sources 35 are also shielded at the first side 39 of the entrance 19 so that the light grids 35 are protected against damage at three sides in total by an encapsulation 49. In this respect, the encapsulation 49 is U-shaped so that the light beams emitted by the light sources 35 may exit in the direction of the second side 39, but the light sources 35 are reliably protected at the other sides. In the same way, the light sensors 41 or the tube 43 in which the light sensors 41 are arranged are also encapsulated at three sides.

FIGS. 3A and 3B again show a respective perspective representation of the pressing device 11, wherein a housing cover of a closed housing 55 is, however, removed at the front side 46 so that the components arranged therein are visible.

Since, in the pressing device shown, the products are, as explained above, manually inserted over the second pressing member 27 into the pressing chamber 13, there has to be a sufficient free space for this insertion in the vertical direction. Accordingly, this free space has to be provided by the third pressing member 29 movable in the vertical direction so that the third pressing member 29 has to cover a comparatively long distance to be able to press a product arranged in the pressing chamber 13. In order nevertheless to be able to perform a pressing process as quickly as possible and to bridge this distance quickly, the pressing device 11 has a first motor 57 and a second motor 59 by which the third pressing member 29 may be moved. The motors 57 and 59 are located beneath the pressing plane 63 in the closed housing 55.

Furthermore, the motors 57 and 59 drive a belt 117 to be able to pull off the third pressing member 29 at four positions in the direction of the pressing plane 63. The motors 57 and 59 are in this respect connected to the belt 117 via a respective gear 61. The first motor 57 is configured to move the third pressing member 29 faster relative to the second motor 59, whereas the second motor 59 is configured to develop a greater force with respect to the first motor 57. Accordingly, a rotational speed of the second motor 59 may be transmitted further reduced to the belt 117 by the associated gear 61 than a rotational speed of the first motor 57 by the associated gear 61.

To enable a fast pressing process, the control device 53 may be configured first to pre-position the third pressing member 29 by the faster first motor 57 and, for example, to bring it into contact with the product located in the pressing chamber 13. Thereupon, the control device 53 may be configured to compress the product by the second motor 59 developing a greater force. For this purpose, the second motor 59 may, for example, be engageable so that the first motor 57 may also continue to rotate during the pressing process. The retraction of the third pressing member 29 after a pressing process may again, for example, take place by the first motor 57. Due to such a driving of the third pressing member 29 by two motors 57 and 59, the free space required for inserting the product into the pressing chamber 13 may thus be bridged quickly, on the one hand, and the required pressing force may nevertheless be developed, on the other hand.

Furthermore, a drive 71 comprising an electric motor 75 by which the second pressing member 27 may be driven is also arranged in the closed housing 55 and below the pressing plane 63. A motor 115 by which the first pressing member 17 movable in the longitudinal direction 11 may be moved is also arranged below the pressing plane 63 and in the closed housing 55. In particular, all the motors 57, 59, 75 and 115 for driving the pressing member 17, 27 and 29 are thus arranged beneath the pressing plane 63 so that a contamination of the product located in the pressing chamber, for example by exiting lubricant, may be prevented.

Furthermore, as already mentioned, the housing 55 in which the motors 57, 59, 75 and 115 are arranged is closed. The housing 55 may in particular be sealed against the pressing plane 63 by a sealing 69 to prevent a contamination of the motors 57, 59, and 75 by fluid exiting during the pressing, for example. Also, an entry of contaminated air from a hall and/or of moisture into the housing 55, by which entry the motors 57, 59, 75 or 115 or the other drive components may be damaged, may likewise be prevented.

Furthermore, an air flow device 65 is arranged in the closed housing 55 and comprises two fans 67. The fans 67 are configured to generate an air flow, in particular an annular flow flowing within the housing 55 along the inner sides of the outer walls of the housing 55, to be able to distribute heat generated by the motors 57, 59, 75, and 115 in the housing 55 and to uniformly lead off the heat via the outer walls of said housing 55 by convection. The total portion or at least a substantial portion of the area of the housing 55 is thus available for the leading off of heat. This enables a cooling of the motors 57, 59, 75, and 115 without an exchange of air between the air in the housing 55 and air located outside the housing 55 being necessary. Any covers of the housing 55 through which access, for example, for maintenance work may be made possible are also sealed by respective sealings 69 (cf., for example, FIG. 3B).

FIGS. 4A and 4B further illustrate the second pressing member 27 and its drive 71 which will also be looked at in more detail below in connection with FIGS. 6A to 8B. The pressing member 27 comprises the carriage 99 to which the pressing tool 101 may be fastened. The carriage 99 is further covered by a protective cover 103, wherein, as FIG. 4B shows, this protective cover 103 may, however, be moved and may in particular be pivoted relative to the pressing member 27. As FIG. 4B shows, access to the components of the drive 71 of the pressing member 27 arranged beneath the carriage 99 may hereby be made possible for, for example, cleaning or maintenance work. In this respect, these components are in particular accessible without the carriage 99 having to be removed from the pressing chamber 13. This may considerably facilitate maintenance and/or cleaning work. FIG. 4B in particular shows that the carriage 99 surrounds an eccentric cam 73 and a further eccentric cam 87 as well as a coupling rod 85, whose functions are explained in more detail below, in the manner of a housing.

While the protective cover 103 is thus pivotable relative to the carriage 99 to enable access to the components of the drive 71 of the pressing member 27 arranged thereunder, the protective cover 103 may furthermore also be removed from the housing 55 of the pressing device 11 without tools, as illustrated by FIGS. 5A to 5C. During a pressing process, during which the pressing member 27 may be moved along a pressing direction P, the carriage 99 may, however, be moved out of the protective cover 103, wherein the protective cover 103 is fastened to the housing 55 and therefore remains unmoved.

FIG. 5A shows the protective cover 103 in a removal position A in which the protective cover 103 is pivoted by 90° relative to the carriage 99. In this position, a tab formed at the protective cover 103 is oriented relative to a securing element 121 fixed to the housing 55 precisely such that the protective cover 103 may be pushed over the securing element 121 and may thereby be released from the housing 55. During a pressing process, during which the protective cover 103 covers the carriage 99, the tab 123, in contrast, engages behind the securing element 121 so that the protective cover 130 is held at the housing (cf. FIG. 5C). Furthermore, FIG. 4B shows that the protective cover 103 has a safety circuit 105 that is configured to detect when the protective cover 103 covers the carriage 99. It may thereby be ensured that the protective cover 103 is securely arranged above the carriage 99 during a pressing process, in order in particular to secure a pinch point which faces the protective cover 103 and towards which the carriage 99 is moved during a movement out of the pressing chamber 13. The safety circuit 105 may in particular be connected to the control device 53 of the pressing device 11, wherein the control device 53 may be configured to start a pressing process only when the safety circuit 105 indicates that the protective cover 103 is correctly positioned.

To be able to compress a product in the pressing chamber 13 by the pressing member 27, the pressing member 27 is movable by the drive 71 (cf. FIGS. 4A, 4B and 6A to 8B) along a pressing direction P between a starting position O, in which the pressing member 27 is the furthest away from the counter-element 31, and an end position E in which the pressing member 27 is moved the furthest towards the counter-element 31. In this respect, the pressing member 27 or the carriage 99 is guided along the pressing direction P via two lateral guides, which are configured as guide rods 119, to achieve as linear as possible a movement of the pressing member 27 without the risk of a canting.

The pressing device 11 may in particular be provided as part of a processing line for meat products, wherein the meat products compressed by the pressing device 11 may, for example, be cut into slices by a slicing apparatus arranged downstream, as already mentioned above. Such a processing line may in particular extend along the longitudinal direction L of the pressing chamber 13, wherein the space available for the pressing device 11 may, however, in particular be restricted on an integration into such a processing line that is usually long anyway. This may also and in particular apply to a direction transverse to the longitudinal direction L which coincides with the pressing direction P of the pressing member 27 and along which the products may also be inserted into the pressing chamber 13 in the insertion direction B. The insertion of the products along the insertion direction B in particular requires a narrow design of the pressing device 11 to enable an access as easy as possible into the pressing chamber 13. At the same time, a drive is, however, required for the pressing member 27 to be able to displace the latter in the pressing direction P, wherein a narrow design of this drive is to be aimed at.

In the pressing device 11 illustrated by the Figures, this is implemented in that the drive 71 is configured to drive an eccentric cam 73, which is rotatable about an axis of rotation D, in order to move the pressing member 27 from the starting position O into the end position E, wherein the pressing member 27 may be moved from the starting position O into the end position E by a rotation of the eccentric cam 73 about more than 90°, here 180°. The axis of rotation D of the eccentric cam 73 is in this respect arranged coaxially to a motor axis of rotation M, about which a motor shaft 77 of the electric motor 75 is rotatable, or corresponds to the motor axis of rotation M.

Since the eccentric cam 73 may be rotated about 180° in order to move the pressing member 27 from the starting position O into the end position E, a comparatively large travel distance may be implemented by the eccentric cam 73 with only a small eccentricity since the travel distance may correspond to twice the eccentricity. Due to the only small eccentricity of the eccentric cam 73, the motor 75 furthermore so-to-say only has to apply comparatively small torques to be able to apply the required force for compressing a product in the pressing chamber 13, for example, approximately 1 kN.

Provision may in particular be made first to move the pressing member 27 during a pressing process, wherein the eccentric cam 73, as in particular FIG. 6B shows, may be oriented in the pressing direction P and in the direction of the pressing chamber 73 in the end position E so that forces transmitted by the product to the pressing member 27 during the movement of the further pressing member 17 and 33 (for compressing the product in the longitudinal direction and in the vertical direction) do not transmit a torque to the motor 75 so that the drive 71 may withstand these forces. Furthermore, due to the only comparatively small torques to be generated, a gear 79, via which the eccentric cam 73 is connected to the electric motor 75 and which may, for example, be configured as a planetary gear set, may also be configured in a comparatively simple and thus favorable manner. The gear 79 may in particular enable a transmission of a rotational speed of the motor shaft 77 to the eccentric cam 73 at a slowed-down rotational speed to be able to generate the required torques by a fast-rotating electric motor 75.

Since the rotation of the electric motor 75 is directly transmitted to the eccentric cam 73 in the sense that a transformation of the rotational movement of the motor 75 into a translatory movement does not take place, a high efficiency of the drive 71 may in particular also be achieved. Furthermore, this direct transmission of the rotational movement, unlike in the case of a driving of an eccentric cam, for example, by a connecting rod of a hydraulic drive, enables said rotation of the eccentric cam 73 about 180°. This is achieved in that the same torque may always be transmitted to the eccentric cam 73 by the electric motor 75, whereas, in the case of a transmission, for example, by a connecting rod moved in a translatory manner, a sufficient torque may only be transmitted in a small angular range.

Furthermore, in the embodiment shown, the axis of rotation D and the motor axis of rotation M are vertically oriented so that the drive 71 extends vertically downwardly from the carriage 99. The drive 71 is in particular vertically held at the carriage 99. Furthermore, the drive 71 or the gear 79 is supported via a torque support 83 at the housing 55 of the pressing device 11 to be able to transmit torques transmitted to the pressing member 27 during the pressing to the housing 55. Since the drive 71 is, however, otherwise not fixed to the housing 55 and is in particular suspended at the pressing member 27, a tolerance compensation between bearings of the gear 79 and bearings of the eccentric cam 73 may be achieved, for example. However, torques may be reliably led off to the housing 75.

To enable a further compensation of torques occurring during the pressing and in particular to protect the guide rods 119 from a load transverse to the pressing direction P, the eccentric cam 73 is connected via a coupling rod 85 to a further eccentric cam 87 that is rotatable about an axis of rotation R in parallel with the axis of rotation D of the eccentric cam 73. The eccentric cam 87 may be driven, via the coupling rod 85, by the electric motor 75 so that only a single drive 71 is provided for the two eccentric cams 73 and 87.

Therefore, the eccentric cam 73 may engage at the carriage 99 or the pressing member 27 via a point of engagement 89 and the further eccentric cam 87 may engage at the carriage 99 or the pressing member 27 via a point of engagement 91, wherein the points of engagement 89 and 91 are spaced apart from one another transversely to the pressing direction P. Via the coupling rod 85, torques occurring during the pressing may be distributed between the points of engagement 91 and 89 or the eccentric cam 73 and the further eccentric cam 87 in order to prevent a deflection of the pressing member 27 transverse to the pressing direction P.

To further improve the transmission of torques, a further eccentric cam 93 is furthermore arranged coaxially to the eccentric cam 73 beneath the eccentric cam 73 and is connected via a further coupling rod 95 to a further lower eccentric cam 97 that is arranged coaxially beneath the further eccentric cam 87. The lower eccentric cam 93 is in this respect arranged offset by 90° from the eccentric cam 73 and the further lower eccentric cam 97 is arranged offset by 90° from the further eccentric cam 87. Furthermore, the lower eccentric cam 93 is likewise rotationally fixedly connected to the motor shaft 77 of the electric motor 75 so that the electric motor 75 may also drive the lower eccentric cam 93 and, via the further coupling rod 95, the further lower eccentric cam 97.

Since the lower eccentric cam 93 and the further lower eccentric cam 97 are arranged offset by 90° from the eccentric cam 73 and the further eccentric cam 87, the lower eccentric cam 93 and the further lower eccentric cam 97 are in particular also oriented along the pressing direction P and perpendicular to the further coupling rod 95 in a position of the pressing member 27 in which the eccentric cam 73 and the further eccentric cam 87 are oriented transversely to the pressing direction and in parallel with the coupling rod 85. This position is in particular reached on a rotation of the eccentric cam 73 about 90°, starting from the starting position O. Since the eccentric cam 73 and the further eccentric cam 87 are aligned in parallel with the coupling rod 85 in this position, an optimal transmission of torques between the point of engagement 89 and the point of engagement 91 cannot take place in this position. Conversely, however, due to the position of the lower eccentric cam 93 and of the further lower eccentric cam 97 perpendicular to the further coupling rod 95, a maximum torque may be transmitted via the further coupling rod 95 in this position of the pressing member 27 so that an optimal compensation may also be achieved in this position. The further coupling rod 95 is further curved to be able to be guided around the axes of rotation D and R of the eccentric cam 73 or of the further eccentric cam 87 during a movement of the pressing member 27 from the starting position O into the end position E, as can, for example, be seen from FIGS. 7A and 7B.

The drive 71 thus makes it possible to drive the pressing member 27 efficiently, wherein a narrow orientation in the pressing direction P may be achieved. Furthermore, the components of the drive 71, in particular the eccentric cam 73, are accessible in the end position E of the pressing member 27 after a removal of the protective cover 103 without the carriage 99 having to be removed from the pressing device 11 or the pressing chamber 13. A cleaning and/or maintenance of the components of the drive 71 may thus in particular take place without the carriage 99 having to be removed. Furthermore, the eccentric cam 73 and also the further eccentric cam 87 are configured to engage at the pressing member 27 or the carriage 99 via a sliding element 81 so that the movements of the coupling rod 85 transverse to the pressing direction P may be compensated during a movement of the pressing member 27. The sliding elements 81 are consequently configured to slide off at the pressing member 27 or at the carriage 99 transversely to the pressing direction P during a movement of the pressing member 27.

REFERENCE NUMERAL LIST 11 pressing device
13 pressing chamber
15 first counter-element
17 first pressing member
19 entrance
21 entrance control device
23 light barrier
25 light grid
27 second pressing member
29 third pressing member
31 second counter-element
33 third counter-element
35 light source
37 first side
39 second side
41 light sensor
43 tube
45 front frame
46 front side
47 rear frame
48 rear side
49 encapsulation
51 state display device
53 control device
55 housing
57 first motor
59 second motor
61 gear
63 pressing plane
65 air flow device
67 fan
69 sealing
71 drive
73 eccentric cam
75 electric motor
77 motor shaft
79 gear
81 sliding element
83 torque support
85 coupling rod
87 further eccentric cam
89 point of engagement
91 point of engagement
93 lower eccentric cam
95 further coupling rod
97 further lower eccentric cam
99 carriage
101 pressing tool
103 protective cover
105 safety circuit
107 marking
109 RFID chip
111 readout device
113 output
115 motor
117 belt
119 guide rod
121 securing element
123 tab
A removal position
B insertion direction
D axis of rotation n
E end position
F release signal
L longitudinal direction
M motor axis of rotation
O starting position
P pressing direction
R axis of rotation
S detection signal

The invention claimed is:

1. A pressing device for pressing meat products, comprising a pressing chamber which extends along a longitudinal direction and into which a product to be pressed can be inserted,
   wherein the pressing chamber comprises at least one counter-element and a pressing member that is movable by a drive,
   wherein the pressing member can be moved from a starting position along a pressing direction towards the at least one counter-element into an end position in order to compress the product, and
   wherein the drive is configured to drive at least one eccentric cam, which is rotatable about an axis of rotation, in order to move the pressing member from the starting position into the end position, wherein the pressing member can be moved between the starting position and the end position by a rotation of the at least one eccentric cam of about 180 degrees,
wherein the pressing chamber comprises a blocking structure that prevents the rotation of the at least one eccentric cam from exceeding about 180 degrees,
wherein the blocking structure comprises a coupling rod.

2. A pressing device in accordance with claim 1,
wherein the drive comprises an electric motor that is configured to drive the at least one eccentric cam,
wherein the axis of rotation of the at least one eccentric cam corresponds to a motor axis of rotation about which a motor shaft of the electric motor is rotatable, or wherein the axis of rotation of the at least one eccentric cam is aligned in parallel with the motor axis of rotation.

3. A pressing device in accordance with claim 2,
wherein a rotation of the motor shaft can be converted into a rotation of the at least one eccentric cam without a deflection into a translatory movement.

4. A pressing device in accordance with claim 1,
wherein the at least one eccentric cam is connected to the pressing member via a sliding element, wherein the sliding element is configured to slide off at the pressing member transversely to the pressing direction during the movement of the pressing member.

5. A pressing device in accordance with claim 1,
wherein the at least one eccentric cam directly mechanically contacts the pressing member.

6. A pressing device in accordance with claim 1,
wherein the axis of rotation of the at least one eccentric cam is oriented at least one of perpendicular to the pressing direction, perpendicular to the longitudinal direction, or along the vertical.

7. A pressing device in accordance with claim 1,
wherein the drive is held by the pressing member.

8. A pressing device in accordance with claim 1,
wherein the drive is supported via a torque support at a housing of the pressing device.

9. A pressing device in accordance with claim 1,
wherein the coupling rod is a first coupling rod, and
wherein the at least one eccentric cam is connected to at least one further eccentric cam via a second coupling rod, wherein the at least one eccentric cam and the at least one further eccentric cam engage at the pressing member at points of engagement spaced apart transversely to the pressing direction.

10. A pressing device in accordance with claim 9,
wherein the drive is configured to drive the at least one further eccentric cam.

11. A pressing device in accordance with claim 9,
wherein the axis of rotation is a first axis of rotation, and
wherein the at least one further eccentric cam is rotatable about a second axis of rotation that extends in parallel with the first axis of rotation of the at least one eccentric cam.

12. A pressing device in accordance with claim 9,
wherein a lower eccentric cam is arranged coaxially to the at least one eccentric cam, wherein the drive is configured to drive the lower eccentric cam.

13. A pressing device in accordance with claim 12,
wherein the lower eccentric cam is oriented offset by 90 degrees from the at least one eccentric cam.

14. A pressing device in accordance with claim 12,
wherein the lower eccentric cam is connected to at least one further lower eccentric cam via the first coupling rod, wherein the at least one further lower eccentric cam is oriented coaxially to and offset by 90 degrees from the at least one further eccentric cam.

15. A pressing device in accordance with claim 14,
wherein the first coupling rod is curved.

16. A pressing device in accordance with claim 1,
wherein the pressing member comprises a carriage, wherein the carriage is arranged above the at least one eccentric cam in the starting position.

17. A pressing device in accordance with claim 16,
wherein the at least one eccentric cam is accessible without a removal of the carriage in the end position of the pressing member.

18. A pressing device in accordance with claim 16,
wherein the pressing member further comprises a pressing tool that can be coupled to the carriage.

19. A pressing device in accordance with claim 1,
wherein the pressing device comprises a protective cover for the pressing member, wherein the protective cover can be removed without tools.

20. A pressing device in accordance with claim 19,
wherein the protective cover is held at a housing of the pressing device, wherein the pressing member can be moved out of the protective cover in the pressing direction.

21. A pressing device in accordance with claim 19,
wherein the protective cover comprises a safety circuit that is configured to detect when the protective cover covers the pressing member.

22. A pressing device for pressing meat products, comprising a pressing chamber which extends along a longitudinal direction and into which a product to be pressed can be inserted,
wherein the pressing chamber comprises at least one counter-element and a pressing member that is movable by a drive,
wherein the pressing member can be moved from a starting position along a pressing direction towards the at least one counter-element into an end position in order to compress the product, and
wherein the drive is configured to drive at least one eccentric cam, which is rotatable about a first axis of rotation, in order to move the pressing member from the starting position into the end position,
wherein the at least one eccentric cam is connected to at least one further eccentric cam via a coupling rod, wherein the at least one eccentric cam and the at least one further eccentric cam engage at the pressing member at points of engagement spaced apart transversely to the pressing direction,
wherein the at least one further eccentric cam is rotatable about a second axis of rotation that extends in parallel with the first axis of rotation and that is not identical to the first axis of rotation,
wherein the pressing member can be moved from the starting position into the end position by a rotation of the at least one eccentric cam of more than 90 degrees.

23. A pressing device for pressing meat products, comprising a pressing chamber which extends along a longitudinal direction and into which a product to be pressed can be inserted,
wherein the pressing chamber comprises at least one counter-element and a pressing member that is movable by a drive,
wherein the pressing member can be moved from a starting position along a pressing direction towards the at least one counter-element into an end position in order to compress the product, wherein the pressing device comprises a protective cover for the pressing member,
wherein the protective cover comprises a safety circuit that is configured to detect when the protective cover covers the pressing member,
wherein the protective cover can be removed without tools,
wherein the drive is configured to drive at least one eccentric cam, which is rotatable about an axis of rotation, in order to move the pressing member from the starting position into the end position, and
wherein the pressing member can be moved from the starting position into the end position by a rotation of the at least one eccentric cam of more than 90 degrees.

* * * * *